(12) United States Patent
Claridge et al.

(10) Patent No.: US 8,685,142 B2
(45) Date of Patent: *Apr. 1, 2014

(54) SYSTEM AND METHOD FOR EFFICIENT AIR DEHUMIDIFICATION AND LIQUID RECOVERY WITH EVAPORATIVE COOLING

(75) Inventors: David E. Claridge, College Station, TX (US); Charles H. Culp, College Station, TX (US); Jeffrey S. Haberl, College Station, TX (US)

(73) Assignee: The Texas A&M University System, College Station, TX (US)

( * ) Notice: Subject to any disclaimer, the term of this patent is extended or adjusted under 35 U.S.C. 154(b) by 200 days.

This patent is subject to a terminal disclaimer.

(21) Appl. No.: 12/945,735

(22) Filed: Nov. 12, 2010

(65) Prior Publication Data

US 2012/0117987 A1    May 17, 2012

(51) Int. Cl.
*B01D 53/22*    (2006.01)

(52) U.S. Cl.
USPC .................. 95/43; 95/45; 95/52; 96/4; 96/7; 96/9; 96/10

(58) Field of Classification Search
CPC ....... B01D 53/22; B01D 53/228; B01D 63/06
USPC ........................ 95/43, 45, 52; 96/4, 7, 9, 10
See application file for complete search history.

(56) References Cited

U.S. PATENT DOCUMENTS

| | | | | |
|---|---|---|---|---|
| 2,506,656 A | * | 5/1950 | Wallach et al. | 95/52 |
| 2,517,499 A | * | 8/1950 | McGrath | 62/93 |
| 3,604,246 A | * | 9/1971 | Toren | 73/38 |
| 3,735,559 A | * | 5/1973 | Salemme | 95/52 |
| 4,466,202 A | * | 8/1984 | Merten | 34/470 |

(Continued)

FOREIGN PATENT DOCUMENTS

| | | |
|---|---|---|
| JP | 60238120 A | 11/1985 |
| JP | 63054920 | 3/1988 |

(Continued)

OTHER PUBLICATIONS

Elvers et al. "Ullmann's Encyclopedia of Industrial Chemistry," Cambridge, New York, p. 204, 1990.*

(Continued)

*Primary Examiner* — Jason M Greene
*Assistant Examiner* — Anthony Shumate
(74) *Attorney, Agent, or Firm* — Fletcher Yoder, P.C.

(57) ABSTRACT

The present invention relates to systems and methods for dehumidifying air by establishing humidity gradients in one or more dehumidification units. Water vapor from relatively humid atmospheric air entering the dehumidification units is extracted by the dehumidification units without substantial condensation into low pressure water vapor vacuum volumes. The water vapor is extracted through water vapor permeable membranes of the dehumidification units into the low pressure water vapor vacuum volumes. The air exiting the dehumidification units is less humid than the air entering the dehumidification units. The low pressure water vapor extracted from the air is compressed to a slightly higher pressure, condensed, and removed from the system at ambient conditions. In addition, each of the dehumidification units may be associated with one or more evaporative cooling units through which the air will be directed, with the evaporative cooling units being upstream and/or downstream of the dehumidification units.

21 Claims, 11 Drawing Sheets

(56) References Cited

U.S. PATENT DOCUMENTS

| | | | |
|---|---|---|---|
| 4,834,779 A * | 5/1989 | Paganessi et al. | 95/44 |
| 4,900,448 A | 2/1990 | Bonne et al. | |
| 4,931,070 A * | 6/1990 | Prasad | 95/52 |
| 5,034,025 A * | 7/1991 | Overmann, III | 95/52 |
| 5,071,451 A | 12/1991 | Wijmans | |
| 5,118,327 A * | 6/1992 | Nelson et al. | 95/10 |
| 5,205,842 A | 4/1993 | Prasad | |
| 5,236,474 A * | 8/1993 | Schofield et al. | 95/47 |
| 5,256,295 A * | 10/1993 | Baker et al. | 210/640 |
| 5,259,869 A | 11/1993 | Auvil et al. | |
| 5,383,956 A | 1/1995 | Prasad et al. | |
| 5,525,143 A | 6/1996 | Morgan et al. | |
| 5,641,337 A * | 6/1997 | Arrowsmith et al. | 95/39 |
| 5,681,368 A * | 10/1997 | Rahimzadeh | 95/19 |
| 6,346,142 B1 * | 2/2002 | Jetter et al. | 96/9 |
| 6,619,064 B1 | 9/2003 | Piao et al. | |
| 6,786,059 B1 | 9/2004 | Piao et al. | |
| 6,887,303 B2 * | 5/2005 | Hesse et al. | 96/8 |
| 7,604,681 B2 | 10/2009 | Malsam et al. | |
| 7,767,256 B2 | 8/2010 | Gu et al. | |
| 8,221,530 B2 * | 7/2012 | Peter et al. | 96/9 |
| 2008/0138569 A1 | 6/2008 | Collier et al. | |
| 2008/0237919 A1 | 10/2008 | Liu et al. | |
| 2008/0299377 A1 | 12/2008 | Gu et al. | |
| 2009/0000475 A1 | 1/2009 | Fekety et al. | |
| 2009/0110873 A1 | 4/2009 | Jiang et al. | |
| 2009/0110907 A1 | 4/2009 | Jiang et al. | |
| 2010/0072291 A1 | 3/2010 | Matsubara | |
| 2010/0297531 A1 | 11/2010 | Liu et al. | |
| 2010/0304953 A1 | 12/2010 | Liu et al. | |
| 2011/0045971 A1 | 2/2011 | Collier et al. | |
| 2011/0052466 A1 | 3/2011 | Liu | |
| 2011/0100900 A1 | 5/2011 | Drury et al. | |
| 2011/0274835 A1 | 11/2011 | Liu et al. | |
| 2012/0118145 A1 * | 5/2012 | Claridge et al. | 95/52 |
| 2012/0118146 A1 * | 5/2012 | Claridge et al. | 95/52 |
| 2012/0118147 A1 * | 5/2012 | Claridge et al. | 95/52 |
| 2012/0118148 A1 * | 5/2012 | Culp et al. | 95/52 |
| 2012/0118155 A1 * | 5/2012 | Claridge et al. | 96/9 |

FOREIGN PATENT DOCUMENTS

| | | |
|---|---|---|
| JP | 05228328 A | 9/1993 |
| JP | 2002136830 A | 5/2002 |
| JP | 2004286262 A | 10/2004 |
| WO | 2008106028 | 9/2008 |

OTHER PUBLICATIONS

"Valve," The American Heritage Dictionary of the English Language: Fourth Edition. 2000.*

Kinsara, A., et al.; "Proposed energy-efficient air-conditioning system using liquid desiccant", Applied Therman Engineering, 16 (10), 791-806, 1996.

Harriman, L.G., et al.; Dehumidification and Cooling Loads From Ventilation, ASHRAE Journal, Nov. 1997, 37-45.

Li, Z., et al.; "Long-term chemical and biological stability of surfacant-modified zeolite", Environ. Sci. Technol., 32 (17), 2628-2632, 1998.

Scovazzo, P., et al.; "Hydrophilic membrane-based humidity control", J. Mem. Sci., 149, 69-81, 1998.

El-Dessouky, H.T., et al.; "A novel air conditioning system—Membrane air drying and evaporative cooling", Chemical Engineering Research & Design, 78 (A7): 999-1009, 2000.

Kawahara, K., et al.; "Antibacterial effect of silver-zeolite on oral bacteria under anaerobic conditions", Dental Materials, 16 (16), 452-455, 2000.

Koros, W.J., et al.; "Pushing the limits on possibilities for large-scale gas separation: which strategies?", J. Mem. Sci. 175, 181-196, 2000.

Scovazzo, P., et al.; "Membrane porosity and hydrophilic membrane-based dehumidification performance", J. Mem. Sci., 167, 217-225, 2000.

Morigami, Y., et al.; "The first large-scale pervaporation plant using tubular-type module with zeolite NaA membrane", Sep. and Purification Tech. 25, 251-260, 2001.

Liu, W., et al.; "Monolith reactor for the dehydrogenation of ethylbenzene to styrene", Ind. Eng. Chem. Res., 41, 3131-38, 2002.

Ye, X., et al.; "Water transport properties of Nafion membranes—Part I. Single-tube membrane module for air drying", Journal of Membrane Science, 221 (1-2): 147-161, 2003.

Ye, X., et al.; "Water transport properties of Nafion membranes—Part II. Multi-tube membrane module for air drying", Journal of Membrane Science, 221 (1-2): 163-173, 2003.

Bhattacharya, M., et al.; "Mass-Transfer Coefficients in Washcoated Monoliths", AIChE J. 50, 2939-2955, 2004.

Kanoglu, M., et al.; "Energy and exergy analyses of an experimental open-cycle desiccant cooling system", Applied Thermal Engineering, 24, 919-923, 2004.

Feng, N., et al.; "Applications of natural zeolite to construction and building materials in China", Construction and Building Materials, 19(80), 579-584, 2005.

Mina, E.M., et al.; "A generalized coefficient of performance for conditioning moist air", International Journal of Refrigeration, 28, 784-790, 2005.

O'Neill, C., et al.; "Durability of hydrophilic and antimicrobial zeolite coatings under water immersion", AlChE Journal, vol. 52, No. 3, 1157-1161, 2006.

Yin, Y., et al.; "Experimental study on dehumidifier and regenerator of liquid desiccant cooling air conditioning system", Building and Environment 42 (7), 2505-2511, 2007.

Li, J., et al.; "Dehumidification and humidification of air by surface-soaked liquid membrane module with triethylene glycol", Journal of Membrane Science, 325 (2):1007-1012, 2008.

Liu, W.; "High surface area inorganic membrane for process water removal", Quarterly Progress Report to DOE Industrial Technology Program Office, Award No. DE-FC36-04GO98014, from Oct. 1, 2008 to present.

Zhang, L.Z., et al.; "Synthesis and characterization of a PVA/LiCl blend membrane for air dehumidification", Journal of Membrane Science, 308 (1-2), 198-206, 2008.

Bernardo, P., et al.; "Membrane gas separation: a review/state of the art", Ind. Eng. Chem. Res., 48, 4638-4663, 2009.

Liang, C.H., et al.; "Independent air dehumidification with membrane-based total heat recovery: Modeling and experimental validation", International Journal of Refrigeration-Revue Internationale Du Froid, 33 (2): 398-408, 2010.

Xiong, Z.Q., et al.; "Development of a novel two-stage liquid desiccant dehumidification system assisted by $CaCl_2$ solution using exergy analysis method", Applied Energy, 87 (5):1495-1504, 2010.

Zhang, J., et al.; "Air dehydration membranes for nonaqueous lithium-air batteries", J. Electrochem. Soc., May 2010, in print, 940-946.

Zhang, J., et al.; "Oxygen-selective immobilized liquid membranes for operation of lithium-air batteries in ambient air", Journal of Power Sources, May 2010, in print, 7438-7444.

Tegrotenhuis, Ward, et al.; "Passive microchannel humidifier for PEM fuel cell water management," 234th ACS National Meeting, Aug. 19-23, 2007, Boston, MA (1 page).

Turner, D., P.E., Ph.D.; "Case Studies of High Humidity Problems in Hot and Humid Climates in the United States," Proceedings: Indoor Air 2005, Energy Systems Laboratory, Texas A&M University System, College Station, Texas.

PCT International Search Report; PCT/US2011/060479; Jun. 21, 2012, pp. 1-9.

* cited by examiner

SYSTEM AND METHOD FOR EFFICIENT AIR DEHUMIDIFICATION AND LIQUID RECOVERY WITH EVAPORATIVE COOLING

BACKGROUND

Heating, ventilating, and air conditioning (HVAC) systems often have dehumidification systems integrated into the cooling apparatus for dehumidifying the air being conditioned by such systems. When cooling is required in warm to hot environments, the air being cooled and dehumidified will usually have a humidity ratio above approximately 0.009 (pounds of $H_2O$ per pounds of dry air). In these environments, the HVAC systems traditionally use refrigerant compressors for sensible cooling of the air and removal of latent energy (i.e., humidity). The air is typically cooled to about 55° F., which condenses $H_2O$ out of the air until the air is about 100% saturated (i.e., relative humidity at about 100%). The 55° F. temperature lowers the humidity ratio to about 0.009 pounds of $H_2O$ per pounds of dry air, which is the water vapor saturation point at 55° F., resulting in a relative humidity of almost 100%. When this air warms to about 75° F., the humidity ratio remains approximately the same, and the relative humidity drops to approximately 50%. This traditional method of dehumidification requires the air to be cooled to about 55° F., and can usually achieve a coefficient of performance (COP) of approximately 3-5.

BRIEF DESCRIPTION

Certain embodiments commensurate in scope with the present disclosure are summarized in the following. These embodiments are not intended to limit the scope of the claimed invention, but rather these embodiments are intended only to provide a brief summary of possible forms of the invention. Indeed, the invention may encompass a variety of forms that may be similar to or different from the embodiments set forth in the following.

In a first embodiment, a dehumidification system for removing water vapor from an airstream is provided. The system includes a first and second channel separated by a membrane. The membrane is configured to facilitate removal of water vapor from an airstream flowing through the first channel by facilitating passage of $H_2O$ from the water vapor to the second channel through permeable volumes of the membrane while substantially blocking all other components of the airstream from passing through the membrane. The system also includes an evaporative cooling unit configured to cool the airstream. The system further includes a pressure increasing device configured to create a lower partial pressure of water vapor within the second channel than in the first channel, such that the $H_2O$ moves through the membrane to the second channel. The pressure increasing device is also configured to increase the pressure of water vapor at an outlet of the pressure increasing device to a partial pressure of water vapor in a range suitable for subsequent condensing into liquid water.

In a second embodiment, a system includes a dehumidification unit for removing $H_2O$ vapor from an airstream. The dehumidification unit includes an air channel configured to receive an inlet airstream and discharge an outlet airstream. The dehumidification unit also includes an $H_2O$ permeable material adjacent to the air channel. The $H_2O$ permeable material is configured to selectively enable $H_2O$ from $H_2O$ vapor in the inlet airstream to pass through the $H_2O$ permeable material to a suction side of the $H_2O$ permeable material and substantially block other components in the inlet airstream from passing through the $H_2O$ permeable material to the suction side of the $H_2O$ permeable material. The system also includes an evaporative cooling unit configured to cool the airstream. The system further includes a pressure increasing device configured to create a lower partial pressure of $H_2O$ vapor of the $H_2O$ permeable material than the partial pressure of the $H_2O$ vapor in the inlet airstream to drive passage of the $H_2O$ from the $H_2O$ vapor in the inlet airstream through the $H_2O$ permeable material, and to increase the pressure at an outlet of the pressure increasing device to a partial pressure of $H_2O$ vapor suitable for condensing $H_2O$ vapor on the suction side into liquid $H_2O$.

In a third embodiment, a method includes receiving an airstream including $H_2O$ vapor into an air channel of a dehumidification unit, wherein the airstream has a first partial pressure of $H_2O$ vapor. The method also includes cooling the airstream via an evaporative cooling unit. The method further includes suctioning $H_2O$ into an $H_2O$ vapor channel of the dehumidification unit through an $H_2O$ permeable material of the dehumidification unit using a pressure differential across the $H_2O$ permeable material. The $H_2O$ vapor channel has a second partial pressure of $H_2O$ vapor lower than the first partial pressure of $H_2O$ vapor of the airstream. In addition, the method includes receiving $H_2O$ vapor from the $H_2O$ vapor channel into a pressure increasing device and increasing the pressure of the $H_2O$ vapor from the pressure increasing device to a third partial pressure of $H_2O$ vapor that is higher than the second partial pressure of $H_2O$ vapor.

BRIEF DESCRIPTION OF THE DRAWINGS

These and other features, aspects, and advantages of embodiments of the present disclosure will become better understood when the following detailed description is read with reference to the accompanying drawings in which like characters represent like parts throughout the drawings, wherein.

DETAILED DESCRIPTION OF SPECIFIC EMBODIMENTS

Figure 1:
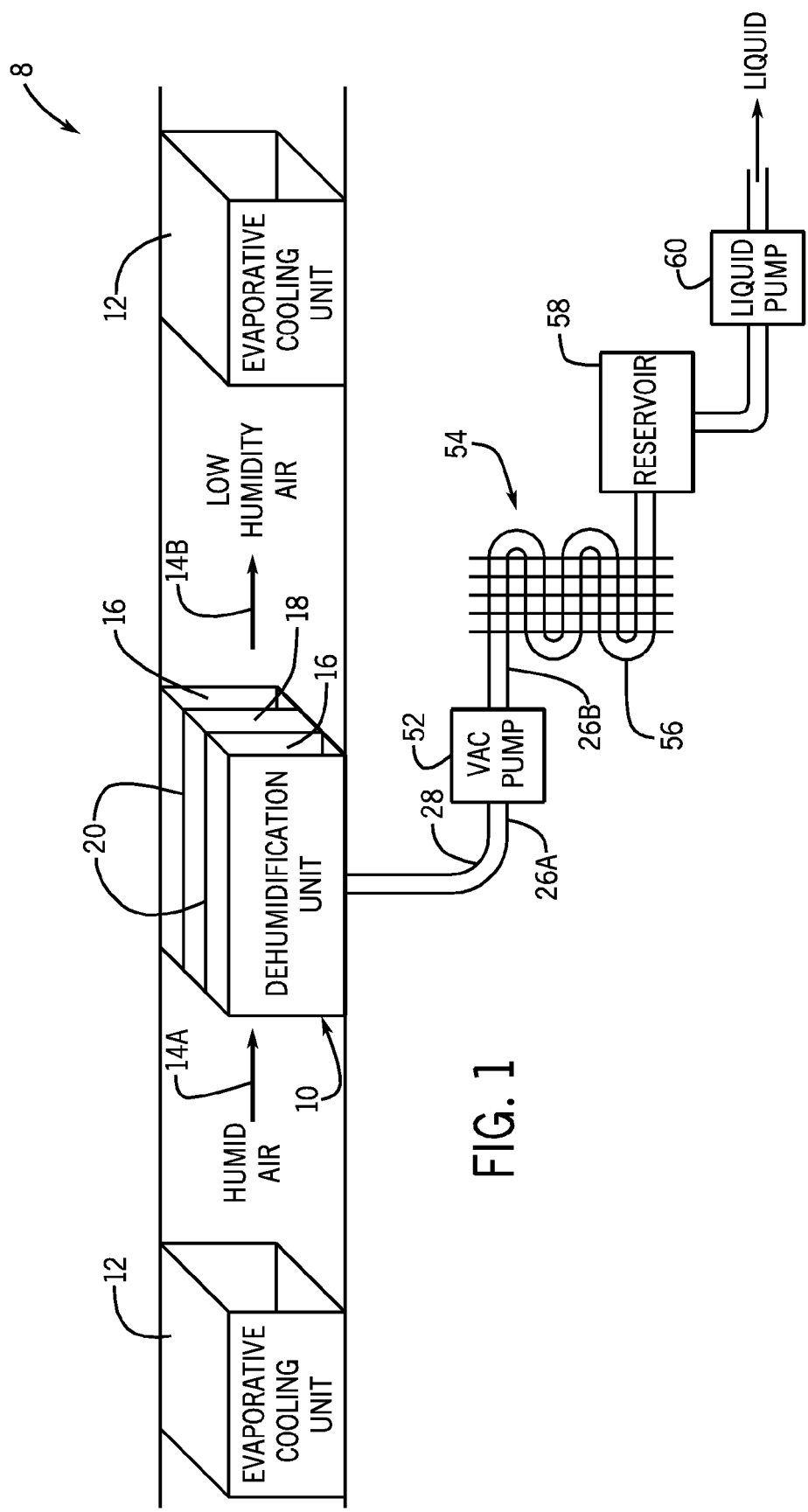
FIG. 1 is a schematic diagram of an HVAC system having a dehumidification unit and one or more evaporative cooling units in accordance with an embodiment of the present disclosure.

Specific embodiments of the present disclosure will be described herein. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The subject matter disclosed herein relates to dehumidification systems and, more specifically, to systems and methods capable of dehumidifying air without initial condensation by establishing a humidity gradient in a dehumidification unit. In one embodiment, a water vapor permeable material (i.e., a water vapor permeable membrane) is used along at least one boundary separating an air channel from a secondary channel or chamber to facilitate the removal of water vapor from the air passing through the air channel. The secondary channel or chamber separated from the air channel by the water vapor permeable material may receive water vapor extracted from the air channel via the water vapor permeable material.

In certain embodiments, the dehumidification unit may be used in conjunction with one or more evaporative cooling units. For example, in certain embodiments, an evaporative cooling unit may be disposed upstream of the dehumidification unit, with the air expelled from the evaporative cooling unit directed into an inlet of the dehumidification unit. Conversely, in other embodiments, the dehumidification unit may be disposed upstream of the evaporative cooling unit, with the air expelled from the dehumidification unit directed into an inlet of the evaporative cooling unit. Indeed, in other embodiments, multiple dehumidification units may be used with multiple evaporative cooling units disposed in between the dehumidification units. Using multiple dehumidification units and multiple evaporative cooling units enables a "sawtooth" progression on a psychrometric chart from initial conditions of temperature and humidity ratio of inlet air to desired final conditions of temperature and humidity ratio of outlet air. In other words, each of the dehumidification units successively dehumidifies the air at substantially constant temperature, while each of the evaporative cooling units successively cools (and humidifies, in the case of direct evaporative cooling) the air until the desired final conditions of temperature and humidity ratio are achieved.

In operation, the water vapor permeable material allows the flow of $H_2O$ (which may refer to $H_2O$ as water molecules, gaseous water vapor, liquid water, adsorbed/desorbed water molecules, absorbed/desorbed water molecules, or combinations thereof) through the water vapor permeable material from the air channel to the secondary channel or chamber, while substantially blocking the flow of other components of the air flowing through the air channel from passing through the water vapor permeable material. As such, the water vapor permeable material reduces the humidity of the air flowing through the air channel by removing primarily only water vapor from the air. Correspondingly, the secondary channel or chamber is filled with primarily water vapor. It should be noted that the passage of $H_2O$ through the water vapor permeable material may be facilitated by a pressure differential. Indeed, a lower partial pressure of water vapor (i.e., a partial pressure less than the partial pressure of water vapor in the air channel) may be created in the secondary channel or chamber to further facilitate passage of the $H_2O$ through the water vapor permeable material. Accordingly, the side of the water vapor permeable material opposite the air channel may be referred to as the suction side of the water vapor permeable material.

Once the $H_2O$ has been passed through the water vapor permeable material, a vacuum pump is used to increase the partial pressure of the water vapor on the suction side of the water vapor permeable material to a minimal saturation pressure required to enable condensation of the water vapor by a condenser. That is, the vacuum pump compresses the water vapor to a pressure in a range suitable for condensing the water vapor into liquid water (e.g., a range of approximately 0.25-1.1 pounds per square inch absolute (psia), with the higher value applying to embodiments using multiple dehumidification units in series), depending on desired conditions for condensation. The condenser then condenses the water vapor into a liquid state, and the resulting liquid water is then pressurized to approximately atmospheric pressure, such that the liquid water may be rejected at ambient atmospheric conditions. By condensing the water vapor to a liquid state prior to expelling it, certain efficiencies are provided. For example, pressurizing liquid water to atmospheric pressure requires less energy than pressurizing water vapor to atmospheric pressure. It should also be noted that the dehumidification unit described herein in general uses significantly less energy than conventional systems.

While the embodiments described herein are primarily presented as enabling the removal of water vapor from air, other embodiments may enable the removal of other $H_2O$ components from air. For example, in certain embodiments, instead of a water vapor permeable material, an $H_2O$ permeable material may be used. As such, the $H_2O$ permeable material may allow the flow of one, all, or any combination of $H_2O$ components (i.e., water molecules, gaseous water vapor, liquid water, adsorbed/desorbed water molecules, absorbed/desorbed water molecules, and so forth) through the $H_2O$ permeable material from the air channel to the secondary channel or chamber, while substantially blocking the flow of other components of the air flowing through the air channel from passing through the $H_2O$ permeable material. In other words, the disclosed embodiments are not limited to the removal of water vapor from air, but rather to the removal of $H_2O$ (i.e., in any of its states) from air. However, for conciseness, the embodiments described herein are primarily focused on the removal of water vapor from air.

FIG. 1 is a schematic diagram of an HVAC system 8 having a dehumidification unit 10 and one or more evaporative cooling units 12 in accordance with an embodiment of the present disclosure. As illustrated, in certain embodiments, the dehumidification unit 10 may receive inlet air 14A having a relatively high humidity from a first evaporative cooling unit 12 on an inlet side of the dehumidification unit 10. Furthermore, in certain embodiments, the dehumidification unit 10 may expel outlet air 14B having a relatively low humidity into a second evaporative cooling unit 12 positioned on an outlet side of the dehumidification unit 10. Aspects of the evaporative cooling units 12 and their positioning in the HVAC system 8 will be discussed in further detail herein. In particular, while FIG. 1 shows evaporative cooling units 12 at the inlet side and the outlet side of the dehumidification unit 10, in other embodiments, the HVAC system 8 may include only an evaporative cooling unit 12 upstream of the dehumidification unit 10, or only an evaporative cooling unit 12 downstream of the dehumidification unit 10. Furthermore, in more complex arrangements, multiple dehumidification units 10 may be used with multiple evaporative cooling units 12.

The dehumidification unit 10 may include one or more air channels 16 through which the air 14 (i.e., the inlet air 14A and the outlet air 14B) flows. In addition, the dehumidification unit 10 may include one or more water vapor channels 18 adjacent to the one or more air channels 16. As illustrated in FIG. 1, the air 14 does not flow through the water vapor channels 18. Rather, the embodiments described herein enable the passage of water vapor from the air 14 in the air channels 16 to the water vapor channels 18, thus dehumidifying the air 14 and accumulating water vapor in the water vapor channels 18. In particular, water vapor from the air 14 in the air channels 16 may be allowed to flow through an interface 20 (i.e., a bather or membrane) between adjacent air channels 16 and water vapor channels 18, while the other components (e.g., nitrogen, oxygen, carbon dioxide, and so forth) of the air 14 are blocked from flowing through the interface 20. In general, the water vapor channels 18 are sealed to create the low pressure that pulls the water vapor from the air 14 in the air channels 16 through the interfaces 20 as $H_2O$ (i.e., as water molecules, gaseous water vapor, liquid water, adsorbed/desorbed water molecules, absorbed/desorbed water molecules, and so forth, through the interfaces 20).

As such, a humidity gradient is established between the air channels 16 and adjacent water vapor channels 18. The humidity gradient is generated by a pressure gradient between the air channels 16 and adjacent water vapor channels 18. In particular, the partial pressure of water vapor in the water vapor channels 18 is maintained at a level lower than the partial pressure of water vapor in the air channels 16, such that the water vapor in the air 14 flowing through the air channels 16 tends toward the suction side (i.e., the water vapor channels 18 having a lower partial pressure of water vapor) of the interfaces 20.

Components of air other than $H_2O$ may be substantially blocked from passing through the interfaces 20 in accordance with present embodiments. In other words, in certain embodiments, approximately 95% or more, approximately 96% or more, approximately 97% or more, approximately 98% or more, or approximately 99% or more of components of the air 14 other than $H_2O$ (e.g., nitrogen, oxygen, carbon dioxide, and so forth) may be blocked from passing through the interfaces 20. When compared to an ideal interface 20 that blocks 100% of components other than $H_2O$, an interface 20 that blocks 99.5% of components other than $H_2O$ will experience a reduction in efficiency of approximately 2-4%. As such, the components other than $H_2O$ may be periodically purged to minimize these adverse effects on efficiency.

Figure 2A:
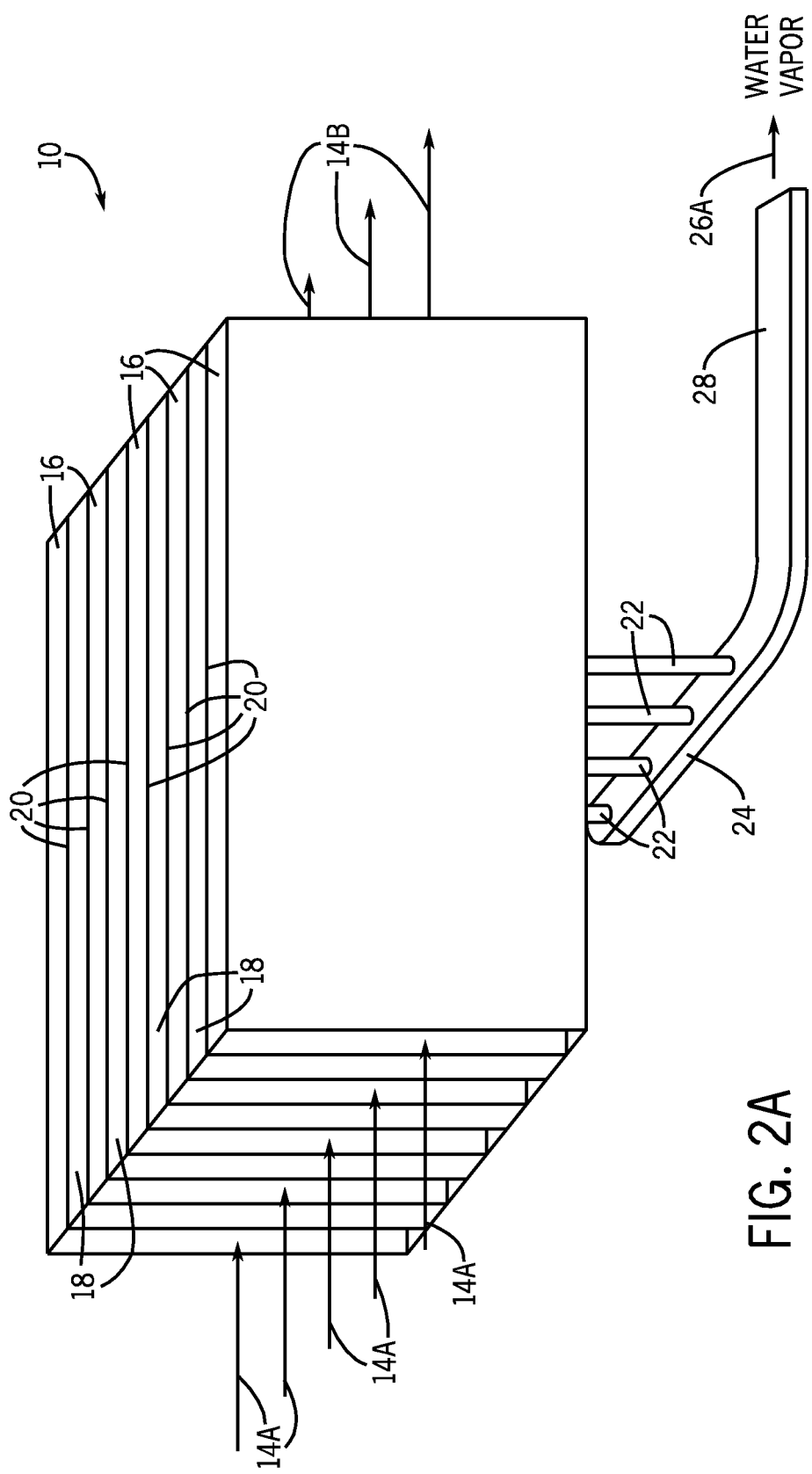
FIG. 2A is a perspective view of the dehumidification unit of FIG. 1 having multiple parallel air channels and water vapor channels in accordance with an embodiment of the present disclosure.

FIG. 2A is a perspective view of the dehumidification unit 10 of FIG. 1 having multiple parallel air channels 16 and water vapor channels 18 in accordance with an embodiment of the present disclosure. In the embodiment illustrated in FIG. 2A, the air channels 16 and the water vapor channels 18 are generally rectilinear channels, which provide a substantial amount of surface area of the interfaces 20 between adjacent air channels 16 and water vapor channels 18. Further, the generally rectilinear channels 16, 18 enable the water vapor 26A to be removed along the path of the air channels 16 before the air 14 exits the air channels 16. In other words, the relatively humid inlet air 14A (e.g., air with a dew point of 55° F. or higher such that the air is appropriate for air conditioning) passes straight through the air channels 16 and exits as relatively dry outlet air 14B because moisture has been removed as the air 14 traverses along the atmospheric pressure side of the interfaces 20 (i.e., the side of the interfaces 20 in the air channels 16). In an embodiment where a single unit is dehumidifying to a 60° F. saturation pressure or below, the suction side of the interfaces 20 (i.e., the side of the interfaces 20 in the water vapor channels 18) will generally be maintained at a partial pressure of water vapor that is lower than the partial pressure of water vapor on the atmospheric pressure side of the interfaces 20.

Figure 2B:
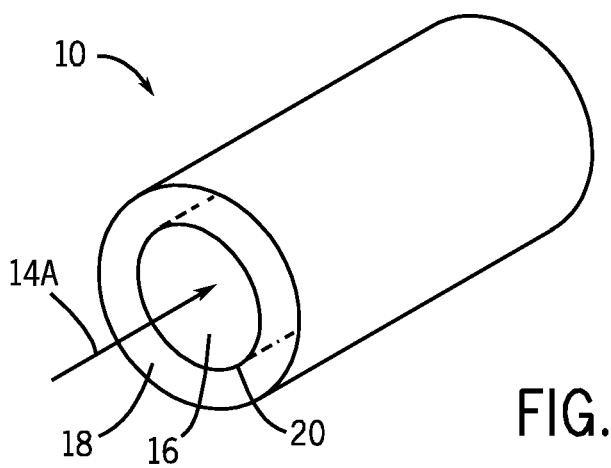
FIG. 2B is a perspective view of the dehumidification unit of FIG. 1 having a single air channel located inside a single water vapor channel in accordance with an embodiment of the present disclosure.

As illustrated in FIG. 2A, each of the water vapor channels 18 is connected with a water vapor channel outlet 22 through which the water vapor in the water vapor channels 18 is removed. As illustrated in FIG. 2A, in certain embodiments, the water vapor channel outlets 22 may be connected via a water vapor outlet manifold 24, wherein the water vapor 26A from all of the water vapor channels 18 is combined in a single water vapor vacuum volume 28, such as a tube or a chamber. Other configurations of the air channels 16 and the water vapor channels 18 may also be implemented. As another example, FIG. 2B is a perspective view of the dehumidification unit 10 of FIG. 1 having a single air channel 16 located inside a single water vapor channel 18 in accordance with an embodiment of the present disclosure. As illustrated, the air channel 16 may be a cylindrical air channel located within a larger concentric cylindrical water vapor channel 18. The embodiments illustrated in FIGS. 2A and 2B are merely exemplary and are not intended to be limiting.

Figure 3:
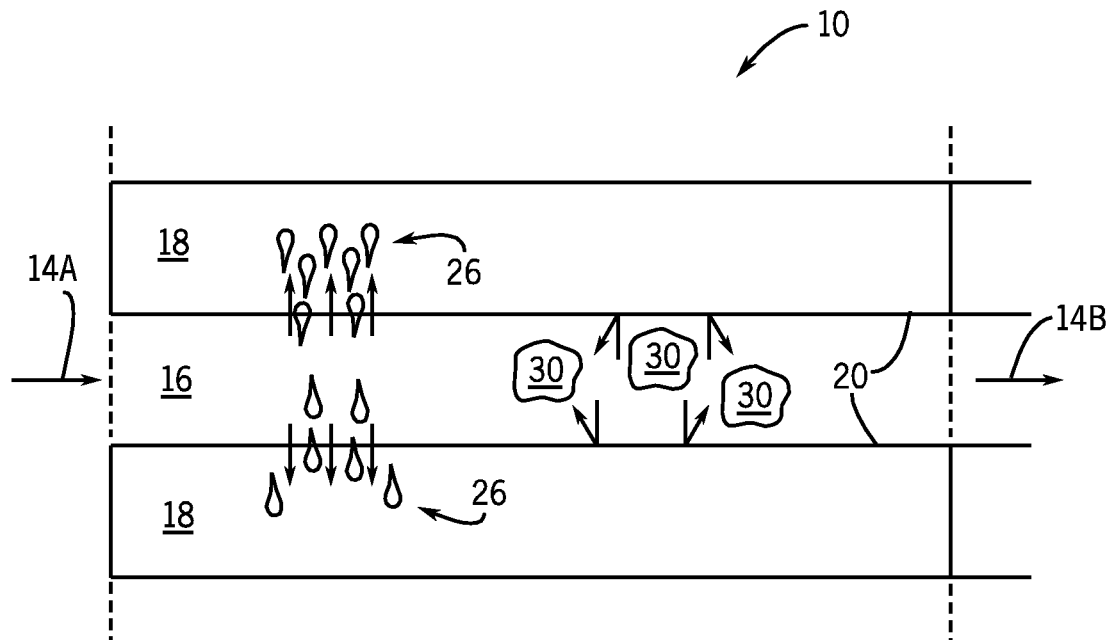
FIG. 3 is a plan view of an air channel and adjacent water vapor channels of the dehumidification unit of FIGS. 1, 2A, and 2B in accordance with an embodiment of the present disclosure.

FIG. 3 is a plan view of an air channel 16 and adjacent water vapor channels 18 of the dehumidification unit 10 of FIGS. 1, 2A, and 2B in accordance with an embodiment of the present disclosure. In FIG. 3, a depiction of the water vapor 26 is exaggerated for illustration purposes. In particular, the water vapor 26 from the air 14 is shown flowing through the interfaces 20 between the air channel 16 and the adjacent water vapor channels 18 as $H_2O$ (i.e., as water molecules, gaseous water vapor, liquid water, adsorbed/desorbed water molecules, absorbed/desorbed water molecules, and so forth, through the interfaces 20). Conversely, other components 30 (e.g., nitrogen, oxygen, carbon dioxide, and so forth) of the air 14 are illustrated as being blocked from flowing through the interfaces 20 between the air channel 16 and the adjacent water vapor channels 18.

In certain embodiments, the interfaces 20 may include membranes that are water vapor permeable and allow the flow of $H_2O$ through permeable volumes of the membranes while blocking the flow of the other components 30. Again, it should be noted that when the $H_2O$ passes through the interfaces 20, it may actually pass as one, all, or any combination of states of water (e.g., as water vapor, liquid water, adsorbed/desorbed water molecules, absorbed/desorbed water molecules, and so forth) through the interfaces 20. For example, in one embodiment, the interfaces 20 may adsorb/desorb water molecules. In another example, the interfaces 20 may adsorb/desorb water molecules and enable passage of water vapor. In other embodiments, the interfaces 20 may facilitate the passage of water in other combinations of states. The interfaces 20 extend along the flow path of the air 14. As such, the water vapor 26 is continuously removed from one side of the interface 20 as the relatively humid inlet air 14A flows through the air channel 16. Therefore, dehumidification of the air 14 flowing through the air channel 16 is accomplished by separating the water vapor 26 from the other components 30 of the air 14 incrementally as it progresses along the flow path of the air channel 16 and continuously contacts the interfaces 20 adjacent to the air channel 16 from the inlet air 14A location to the outlet air 14B location.

In certain embodiments, the water vapor channels 18 are evacuated before use of the dehumidification unit 10, such that a lower partial pressure of the water vapor 26 (i.e., a partial pressure less than the partial pressure of water vapor in the air channels 16) is created in the water vapor channels 18. For example, the partial pressure of the water vapor 26 in the water vapor channels 18 may be in the range of approximately 0.10-0.25 psia during normal operation, which corresponds to dehumidifying to a 60° F. saturation pressure or below. In this example, an initial condition in the 0.01 psia range may be used to remove noncondensables, whereas the partial pressure of water vapor in the air channels 16 may be in the range of approximately 0.2-1.0 psia. However, at certain times, the pressure differential between the partial pressure of the water vapor in the water vapor channels 18 and the air channels 16 may be as low as (or lower than) 0.01 psia. The lower partial pressure of water vapor in the water vapor channels 18 further facilitates the flow of water vapor 26 from the air channels 16 to the water vapor channels 18 because the air 14 flowing through the air channels 16 is at local atmospheric pressure (i.e., approximately 14.7 psia at sea level). Since the partial pressure of water vapor in the air 14 in the air channels 16 is greater than the partial pressure of the water vapor 26 in the water vapor channels 18, a pressure gradient is created from the air channels 16 to the water vapor channels 18. As described previously, the interfaces 20 between adjacent air channels 16 and water vapor channels 18 provide a barrier, and allow substantially only water vapor 26 to flow from the air 14 in the air channels 16 into the water vapor channels 18. As such, the air 14 flowing through the air channels 16 will generally decrease in humidity from the inlet air 14A to the outlet air 14B.

The use of water vapor permeable membranes as the interfaces 20 between the air channels 16 and the water vapor channels 18 has many advantages. In particular, in some embodiments, no additional energy is required to generate the humidity gradient from the air channels 16 to the water vapor channels 18. In addition, in some embodiments, no regeneration is involved and no environmental emissions (e.g., solids, liquids, or gases) are generated. Indeed, in accordance with one embodiment, separation of the water vapor 26 from the other components 30 of the air 14 via water permeable membranes (i.e., the interfaces 20) can be accomplished at energy efficiencies much greater than compressor technology used to condense water directly from the airstream.

Because water vapor permeable membranes are highly permeable to water vapor, the costs of operating the dehumidification unit 10 may be minimized because the air 14 flowing through the air channels 16 does not have to be significantly pressurized to facilitate the passage of $H_2O$ through the interfaces 20. Water vapor permeable membranes are also highly selective to the permeation of the water vapor from the air 14. In other words, water vapor permeable membranes are very efficient at preventing components 30 of the air 14 other than water vapor from entering the water vapor channels 18. This is advantageous because the $H_2O$ passes through the interfaces 20 due to a pressure gradient (i.e., due to the lower partial pressures of water vapor in the water vapor channels 18) and any permeation or leakage of air 14 into the water vapor channels 18 will increase the power consumption of the vacuum pump used to evacuate the water vapor channels 18. In addition, water vapor permeable membranes are rugged enough to be resistant to air contamination, biological degradation, and mechanical erosion of the air channels 16 and the water vapor channels 18. Water vapor permeable membranes may also be resistant to bacteria attachment and growth in hot, humid air environments in accordance with one embodiment.

Figure 4:
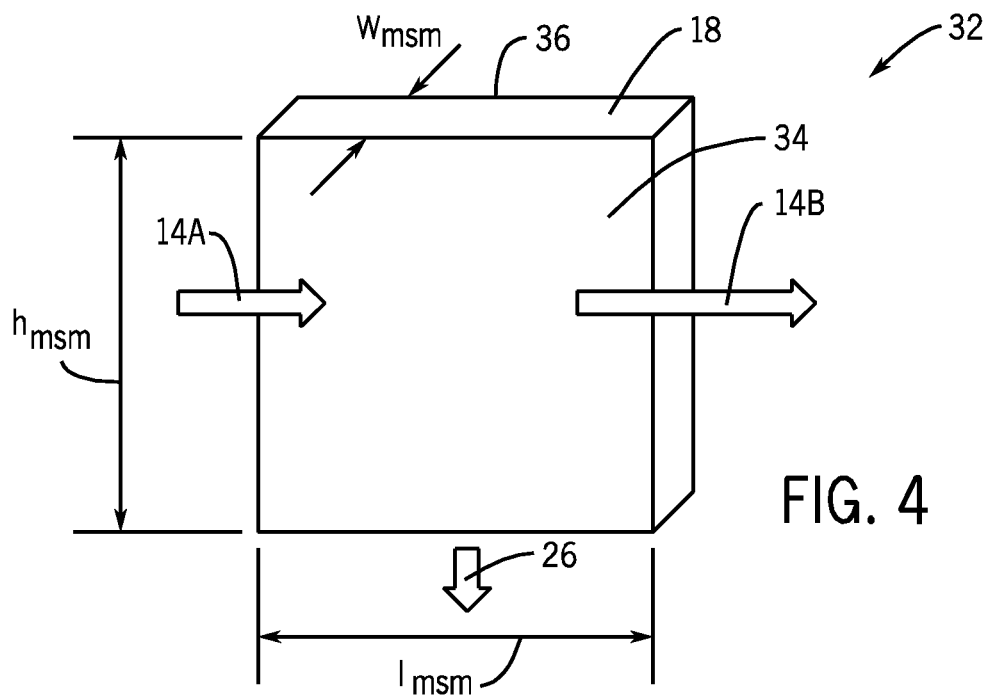
FIG. 4 is a perspective view of a separation module formed using a membrane that may be used as a water vapor channel of the dehumidification unit of FIGS. 1-3 in accordance with an embodiment of the present disclosure.

One example of a material used for the water vapor permeable membranes (i.e., the interfaces 20) is zeolite supported on thin, porous metal sheets. In particular, in certain embodiments, an ultrathin (e.g., less than approximately 2 µm), dense zeolite membrane film may be deposited on an approximately 50 µm thick porous metal sheet. The resulting membrane sheets may be packaged into a membrane separation module to be used in the dehumidification unit 10. FIG. 4 is a perspective view of a separation module 32 formed using a membrane that may be used as a water vapor channel 18 of the dehumidification unit 10 of FIGS. 1-3 in accordance with an embodiment of the present disclosure. Two membrane sheets 34, 36 may be folded and attached together into a generally rectangular shape with a channel for the water vapor having a width $w_{msm}$ of approximately 5 mm. The separation module 32 may be positioned within the dehumidification unit 10 such that the membrane coating surface is exposed to the air 14. The thinness of the metal support sheet reduces the weight and cost of the raw metal material and also minimizes resistance to the $H_2O$ diffusing through the water vapor permeable membrane film deposited on the membrane sheets 34, 36. The metallic nature of the sheets 34, 36 provides mechanical strength and flexibility for packaging such that the separation module 32 can withstand a pressure gradient of greater than approximately 60 psi (i.e., approximately 4 times atmospheric pressure).

Separation of water vapor from the other components 30 of the air 14 may create a water vapor permeation flux of approximately 1.0 kg/m$^2$/h (e.g., in a range of approximately 0.5-2.0 kg/m$^2$/h), and a water vapor-to-air selectivity range of approximately 5-200+. As such, the efficiency of the dehumidification unit 12 is relatively high compared to other conventional dehumidification techniques with a relatively low cost of production. As an example, approximately 7-10 m$^2$ of membrane area of the interfaces 20 may be needed to dehumidify 1 ton of air cooling load under ambient conditions. In order to handle such an air cooling load, in certain embodiments, 17-20 separation modules 32 having a height $h_{msm}$ of approximately 450 mm, a length $l_{msm}$ of approximately 450 mm, and a width $w_{msm}$ of approximately 5 mm may be used. These separation modules 32 may be assembled side-by-side in the dehumidification unit 10, leaving approximately 2 mm gaps between the separation modules 32. These gaps define the air channels 16 through which the air 14 flows. The measurements described in this example are merely exemplary and not intended to be limiting.

Figure 5:
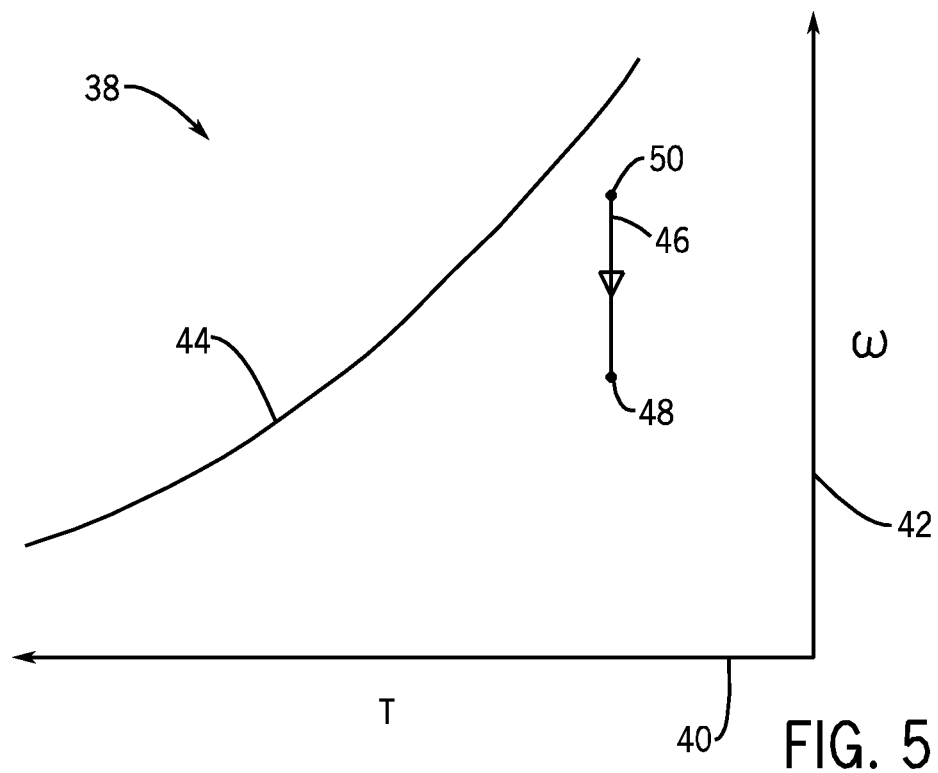
FIG. 5 is a psychrometric chart of the temperature and the humidity ratio of the moist air flowing through the dehumidification unit of FIGS. 1-3 in accordance with an embodiment of the present disclosure.

FIG. 5 is a psychrometric chart 38 of the temperature and the humidity ratio of the moist air 14 flowing through the dehumidification unit 12 of FIGS. 1-3 in accordance with an embodiment of the present disclosure. In particular, the x-axis 40 of the psychrometric chart 38 corresponds to the temperature of the air 14 flowing through the air channels 16 of FIG. 1, the y-axis 42 of the psychrometric chart 38 corresponds to the humidity ratio of the air 14 flowing through the air channels 16, and the curve 44 represents the water vapor saturation curve of the air 14 flowing through the air channels 16. As illustrated by line 46, because water vapor is removed from the air 14 flowing through the air channels 16, the humidity ratio of the outlet air 14B (i.e., point 48) from the dehumidification unit 12 of FIGS. 1-3 is lower than the humidity ratio of the inlet air 14A (i.e., point 50) into the dehumidification unit 12 of FIGS. 1-3, while the temperature of the outlet air 14B and the inlet air 14A are substantially the same.

Returning now to FIG. 1, as described previously, a lower partial pressure of the water vapor 26 (i.e., a partial pressure less than the partial pressure of water vapor in the air channels 16) is created in the water vapor channels 18 of the dehumidification unit 10 to further facilitate the passage of H$_2$O through the interfaces 20 from the air channels 16 to the water vapor channels 18. In certain embodiments, the water vapor channels 18 may initially be evacuated using a vacuum pump 52. In particular, the vacuum pump 52 may evacuate the water vapor channels 18 and the water vapor vacuum volume 28, as well as the water vapor outlets 22 and the water vapor manifold 24 of FIG. 2A. However, in other embodiments, a pump separate from the vacuum pump 52 may be used to evacuate the water vapor channels 18, water vapor vacuum volume 28, water vapor outlets 22, and water vapor manifold 24. As illustrated in FIG. 1, the water vapor 26 removed from the air 14 in the dehumidification unit 10 may be distinguished between the water vapor 26A in the water vapor vacuum volume 28 (i.e., the suction side of the vacuum pump 52) and the water vapor 26B expelled from an exhaust side (i.e., an outlet) of the vacuum pump 52 (i.e., the water vapor 26B delivered to a condensation unit). In general, the water vapor 26B expelled from the vacuum pump 52 will have a slightly higher pressure and a higher temperature than the water vapor 26A in the water vapor vacuum volume 28. The vacuum pump 52 may be a compressor or any other suitable pressure increasing device capable of maintaining a lower pressure on the suction side of the vacuum pump 52 than the partial pressure of water vapor in the humid air 14.

For example, the lower partial pressure of water vapor 26A maintained in the water vapor vacuum volume 28 may be in the range of approximately 0.15-0.25 psia, which corresponds to saturation temperatures of approximately 45° F. to 60° F., with the water vapor 26A typically be in the range of approximately 65-75° F. However, in other embodiments, the water vapor 26A in the water vapor vacuum volume 28 may be maintained at a partial pressure of water vapor in the range of approximately 0.01-0.25 psia and a temperature in the range of approximately 55° F. up to the highest ambient air temperature. A specific embodiment may be designed to lower the partial pressure in the water vapor vacuum volume 28 to the range of 0.01 psia to increase the capacity for removing water vapor from the air 14 to enable an evaporative cooler to process the entire air conditioning load when atmospheric conditions permit this mode of operation.

In certain embodiments, the vacuum pump 52 is a low-pressure pump configured to decrease the pressure of the water vapor 26A in the water vapor vacuum volume 28 to a lower partial pressure than the partial pressure of water vapor on the atmospheric side of the interfaces 20 (i.e., the partial pressure of the air 14 in the air channels 16). On the exhaust side of the vacuum pump 52, the partial pressure of the water vapor 26B has been increased just high enough to facilitate condensation of the water vapor (i.e., in a condensation unit 54). Indeed, the vacuum pump 52 is configured to increase the pressure such that the water vapor 26B in the condensation unit 54 is at a pressure proximate to a minimal saturation pressure in the condensation unit 54.

As an example, when in operation, the air 14 may enter the system at a partial pressure of water vapor of 0.32 psia, which corresponds to a humidity ratio of 0.014 pounds of H$_2$O per pounds of dry air. The system may be set to remove 0.005 pounds of H$_2$O per pounds of dry air from the air 14. Pressure differentials across the interfaces 20 may be used to create a flow of H$_2$O through the interfaces 20. For example, the partial pressure of water vapor in the water vapor vacuum volume 28 may be set to approximately 0.1 psia. The pressure of the water vapor 26B is increased by the vacuum pump 52 in a primarily adiabatic process, and as the pressure of the water vapor 26B increases, the temperature increases as well (in contrast to the relatively negligible temperature differential across the interfaces 20). As such, if for example the pressure of the water vapor 26B is increased in the vacuum pump 52 by 0.3 psi (i.e., to approximately 0.4 psia), the condensation unit 54 is then capable of condensing the water vapor 26B at a temperature of approximately 72-73° F., and the temperature of the water vapor 26B will increase to a temperature substantially higher than the condenser temperature. The system may continually monitor the pressure and temperature conditions of both the upstream water vapor 26A and the downstream water vapor 26B to ensure that the water vapor 26B expelled from the vacuum pump 52 has a partial pressure of water vapor just high enough to facilitate condensation in the condensation unit 54. It should be noted that the pressure and temperature values presented in this scenario are merely exemplary and are not intended to be limiting.

Note that as the pressure difference from the water vapor 26A entering the vacuum pump 52 to the water vapor 26B exiting the vacuum pump 52 increases, the efficiency of the dehumidification unit 10 decreases. For example, in a preferred embodiment, the vacuum pump 52 will be set to adjust the pressure of the water vapor 26B in the condensation unit 54 slightly above the saturation pressure at the lowest ambient temperature of the cooling media (i.e., air or water) used by the condensation unit 54 to condense the water vapor 26B. In another embodiment, the temperature of the water vapor 26B may be used to control the pressure in the condensation unit 54. The temperature of the water vapor 26B expelled from the vacuum pump 52 may be substantially warmer than the humid air 14A (e.g., this temperature could reach 200° F. or above depending on a variety of factors). Because the vacuum pump 52 only increases the pressure of the water vapor 26B to a point where condensation of the water vapor 26B is facilitated (i.e., approximately the saturation pressure), the power requirements of the vacuum pump 52 are relatively small, thereby obtaining a high efficiency from the dehumidification unit 10.

Once the water vapor 26B has been slightly pressurized (i.e., compressed) by the vacuum pump 52, the water vapor 26B is directed into the condensation unit 54, wherein the water vapor 26B is condensed into a liquid state. In certain embodiments, the condensation unit 54 may include a condensation coil 56, a pipe/tube condenser, a flat plate condenser, or any other suitable system for causing a temperature below the condensation point of the water vapor 26B. The condensation unit 54 may either be air cooled or water cooled. For example, in certain embodiments, the condensation unit 54 may be cooled by ambient air or water from a cooling tower. As such, the costs of operating the condensation unit 54 may be relatively low, inasmuch as both ambient air and cooling tower water are in relatively limitless supply.

Once the water vapor 26B has been condensed into a liquid state, in certain embodiments, the liquid water from the condensation unit 54 may be directed into a reservoir 58 for temporary storage of saturated vapor and liquid water. However, in other embodiments, no reservoir 58 may be used. In either case, the liquid water from the condensation unit 54 may be directed into a liquid pump 60 (i.e., a water transport device), within which the pressure of the liquid water from the condensation unit 54 is increased to approximately atmospheric pressure (i.e., approximately 14.7 psia) so that the liquid water may be rejected at ambient conditions. As such, the liquid pump 60 may be sized just large enough to increase the pressure of the liquid water from the condensation unit 54 to approximately atmospheric pressure. Therefore, the costs of operating the liquid pump 60 may be relatively low. In addition, the liquid water from the liquid pump 60 may be at a slightly elevated temperature due to the increase in the pressure of the liquid water. As such, in certain embodiments, the heated liquid water may be transported for use as domestic hot water, further increasing the efficiency of the system by recapturing the heat transferred into the liquid water.

Although the interfaces 20 between the air channels 16 and the water vapor channels 18 as described previously generally allow only $H_2O$ to pass from the air channels 16 to the water vapor channels 18, in certain embodiments, very minimal amounts (e.g., less than 1% of the oxygen ($O_2$), nitrogen ($N_2$), or other noncondensable components) of the other components 30 of the air 14 may be allowed to pass through the interfaces 20 from the air channels 16 to the water vapor channels 18. Over time, the amount of the other components 30 may build up in the water vapor channels 18 (as well as in the water vapor vacuum volume 28, the water vapor outlets 22, and the water vapor manifold 24 of FIG. 2A). In general, these other components 30 are noncondensable at the condenser temperature ranges used in the condensation unit 54. As such, the components 30 may adversely affect the performance of the vacuum pump 52 and all other equipment downstream of the vacuum pump 52 (in particular, the condensation unit 54).

Figure 6:
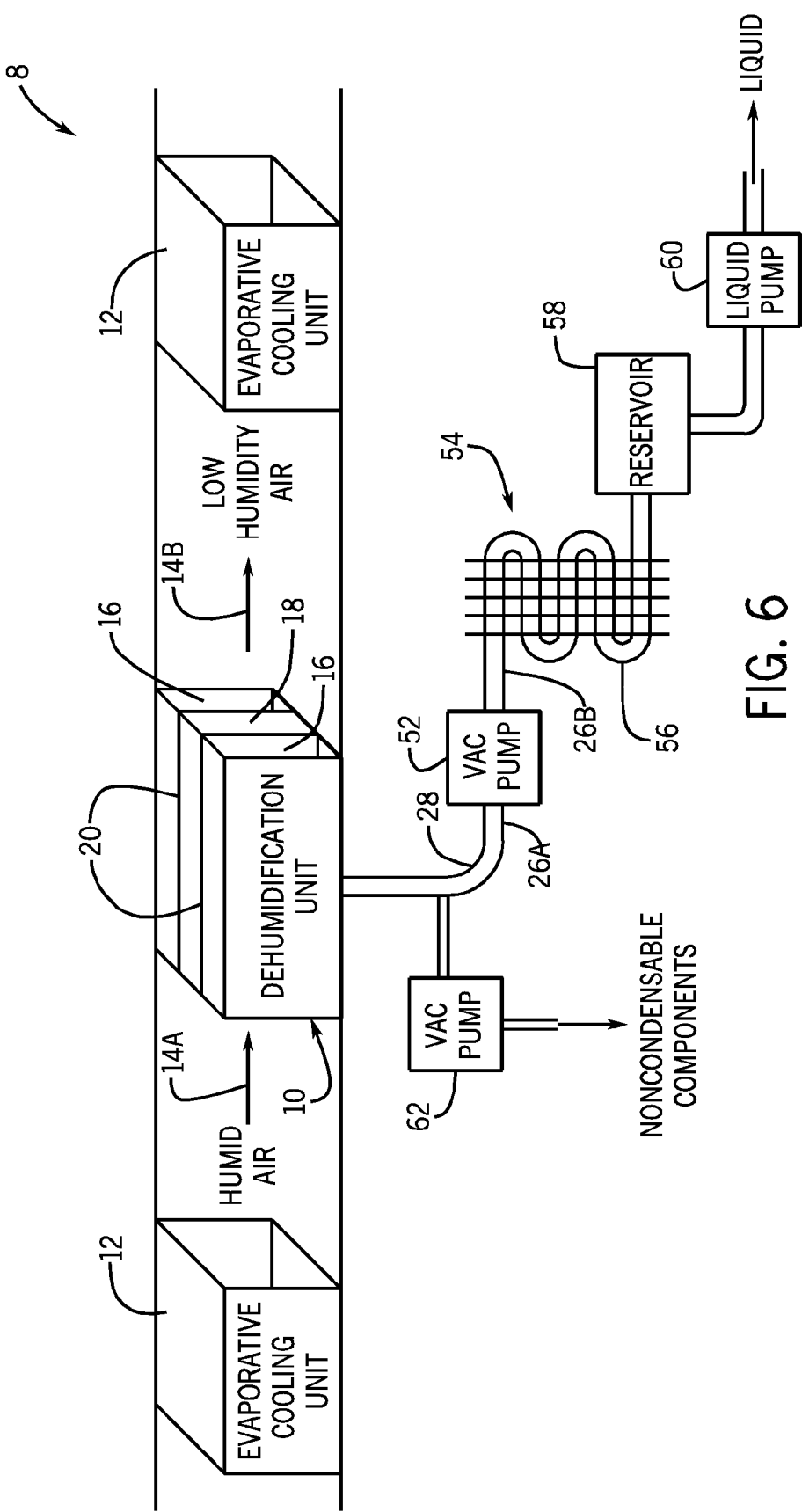
FIG. 6 is a schematic diagram of the HVAC system and the dehumidification unit and the one or more evaporative cooling units of FIG. 1 having a vacuum pump for removing noncondensable components from the water vapor in the water vapor extraction chamber of the dehumidification unit in accordance with an embodiment of the present disclosure.

Accordingly, in certain embodiments, a second vacuum pump may be used to periodically purge the other components 30 from the water vapor vacuum volume 28. FIG. 6 is a schematic diagram of the HVAC system 8 and the dehumidification unit 10 and the one or more evaporative cooling units 12 of FIG. 1 having a vacuum pump 62 for removing noncondensable components 30 from the water vapor 26A in the water vapor vacuum volume 28 of the dehumidification unit 10 in accordance with an embodiment of the present disclosure. The vacuum pump 62 may, in certain embodiments, be the same pump used to evacuate the water vapor vacuum volume 28 (as well as the water vapor channels 18, the water vapor outlets 22, and the water vapor manifold 24) to create the lower partial pressure of water vapor described previously that facilitates the passage of the $H_2O$ through the interfaces 20 from the air channels 16 to the water vapor channels 18. However, in other embodiments, the vacuum pump 62 may be different from the pump used to evacuate the water vapor vacuum volume 28 to create the lower partial pressure of water vapor.

Figure 7:
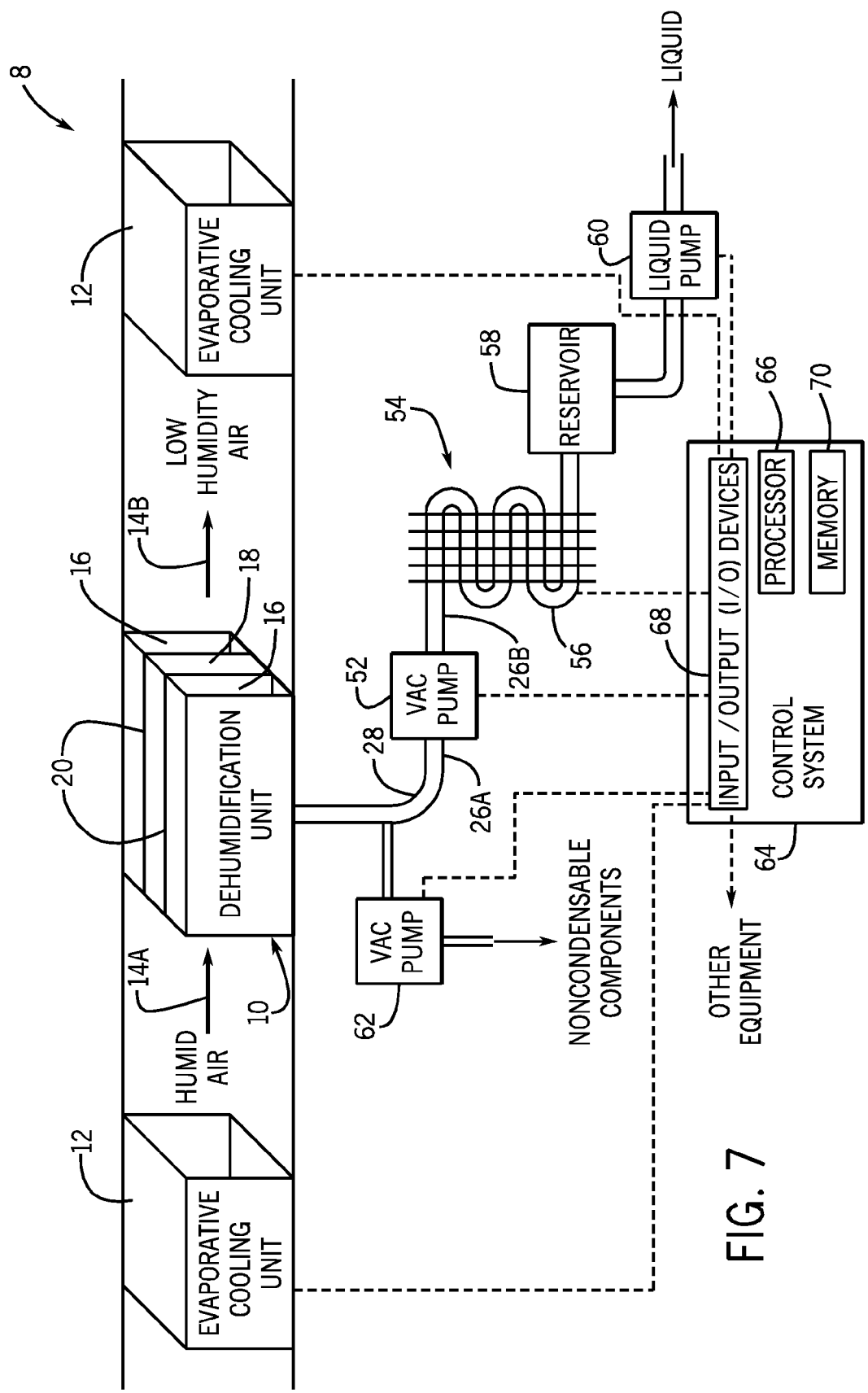
FIG. 7 is a schematic diagram of the HVAC system and the dehumidification unit and the one or more evaporative cooling units of FIG. 6 having a control system for controlling various operating conditions of the HVAC system and the dehumidification unit in accordance with an embodiment of the present disclosure.

The dehumidification unit 10 described herein may also be controlled between various operating states, and modulated based on operating conditions of the dehumidification unit 10. For example, FIG. 7 is a schematic diagram of the HVAC system 8 and the dehumidification unit 10 and the one or more evaporative cooling units 12 of FIG. 6 having a control system 64 for controlling various operating conditions of the HVAC system 8 and the dehumidification unit 10 and the one or more evaporative cooling units 12 in accordance with an embodiment of the present disclosure. The control system 64 may include one or more processors 66, for example, one or more "general-purpose" microprocessors, one or more special-purpose microprocessors and/or ASICS (application-specific integrated circuits), or some combination of such processing components. The processors 66 may use input/output (I/O) devices 68 to, for example, receive signals from and issue control signals to the components of the dehumidification unit 10 (i.e., the vacuum pumps 52, 62, the condensation unit 54, the reservoir 58, the liquid pump 60, other equipment such as a fan blowing the inlet air 14A through the dehumidification unit 10, sensors configured to generate signals related to characteristics of the inlet and outlet air 14A, 14B, and so forth) and the one or more evaporative cooling units 12. The processors 66 may take these signals as inputs and calculate how to control the functionality of these components of the dehumidification unit 10 and the one or more evaporative cooling units 12 to most efficiently cool the air 14 while also removing the water vapor 26 from the air 14 flowing through the dehumidification unit 10. The control system 64 may also include a nontransitory computer-readable medium (i.e., a memory 70) which, for example, may store instructions or data to be processed by the one or more processors 66 of the control system 64.

For example, the control system 64 may be configured to control the rate of removal of the noncondensable components 30 of the water vapor 26A from the water vapor vacuum volume 28 of the dehumidification unit 10 by turning the vacuum pump 62 on or off, or by modulating the rate at which the vacuum pump 62 removes the noncondensable components 30 of the water vapor 26A. More specifically, in certain embodiments, the control system 64 may receive signals from a sensor in the water vapor vacuum volume 28 that detects when too many noncondensable components 30 are present in the water vapor 26A contained in the water vapor vacuum volume 28. This process of noncondensable component removal will operate in a cyclical manner. In "normal" operation of removing the water vapor 26 from the air 14, the vacuum pump 62 will not be in operation. As the noncondensable components 30 build up in the water vapor vacuum volume 28, the internal pressure in the water vapor vacuum volume 28 will eventually reach a setpoint. At this point in time, the vacuum pump 62 will turn on and remove all components (i.e., both the noncondensable components 30 as well as $H_2O$, including the water vapor) until the internal pressure in the water vapor vacuum volume 28 reaches another setpoint (e.g., lower than the starting vacuum pressure). Then, the vacuum pump 62 shuts off and the dehumidification unit 10 returns to the normal operational mode. Setpoints may either be preset or dynamically determined. A preferred method will be to have the vacuum pump 62 only operating in the purge mode intermittently.

Another example of the type of control that may be accomplished by the control system 64 is modulating the lower partial pressure of the water vapor 26A in the water vapor vacuum volume 28 (as well as the water vapor channels 18, the water vapor outlets 22, and the water vapor manifold 24) to modify the water vapor removal capacity and efficiency ratio of the dehumidification unit 10. For example, the control system 64 may receive signals from pressure sensors in the water vapor vacuum volume 28, the water vapor channels 18, the water vapor outlets 22, and/or the water vapor manifold 24, as well as signals generated by sensors relating to characteristics (e.g., temperature, pressure, flow rate, relative humidity, and so forth) of the inlet and outlet air 14A, 14B, among other things. The control system 64 may use this information to determine how to modulate the lower partial pressure of the water vapor 26A (e.g., with respect to the partial pressure of water vapor in the air 14 flowing through the air channels 16) to increase or decrease the rate of removal of water vapor 26 from the air channels 16 to the water vapor channels 18 through the interfaces 20.

For example, if more water vapor removal is desired, the lower partial pressure of the water vapor 26A in the water vapor vacuum volume 28 may be reduced and, conversely, if less water vapor removal is desired, the lower partial pressure of the water vapor 26A in the water vapor vacuum volume 28 may be increased. Furthermore, in certain embodiments, the amount of dehumidification (i.e., water vapor removal) may be cycled to improve the efficiency of the dehumidification unit 10. More specifically, under certain operating conditions, the dehumidification unit 10 may function more efficiently at higher rates of water vapor removal. As such, in certain embodiments, the dehumidification unit 10 may be cycled to remove a maximum amount of water vapor from the air 14 for a while, then to remove relatively no water vapor from the air 14 for a while, then to remove a maximum amount of water vapor from the air 14 for a while, and so forth. In other words, the dehumidification unit 10 may be operated at full water vapor removal capacity for periods of time alternating with other periods of time where no water vapor is removed. In addition, the control system 64 may be configured to control start-up and shutdown sequencing of the dehumidification unit 10.

The dehumidification unit 10 and the evaporative cooling units 12 may be designed and operated in many various modes, and at varying operating conditions. In general, the dehumidification unit 10 will be operated with the water vapor vacuum volume 28 (as well as the water vapor channels 18, the water vapor outlets 22, and the water vapor manifold 24) at a water vapor partial pressure below the water vapor partial pressure of the air 14 flowing through the air channels 16. In certain embodiments, the dehumidification unit 10 and the evaporative cooling units 12 may be optimized for dedicated outside air system (DOAS) use, wherein the air 14 may have a temperature in the range of approximately 55-100° F., and a relative humidity in the range of approximately 55-100%. In other embodiments, the dehumidification unit 10 and the evaporative cooling units 12 may be optimized for residential use for recirculated air having a temperature in the range of approximately 70-85° F., and a relative humidity in the range of approximately 55-65%. Similarly, in certain embodiments, the dehumidification unit 10 and the evaporative cooling units 12 may be optimized for dehumidifying outside air in commercial building recirculated air systems, which dehumidifies the inlet air 14A having a temperature in the range of approximately 55-110° F., and a relative humidity in the range of approximately 55-100%. The outlet air 14B has less humidity and about the same temperature as the inlet air 14A, unless cooling is performed on the outlet air 14B.

The dehumidification unit 10 described herein requires less operating power than conventional dehumidification systems because of the relatively low pressures that are required to dehumidify the air 14A. This is due at least in part to the ability of the interfaces 20 (i.e., water vapor permeable membranes) to remove the water vapor 26 from the air 14 efficiently without requiring excessive pressures to force the water vapor 26 through the interfaces 20. For example, in one embodiment, the minimal power needed to operate the dehumidification unit 10 includes only the fan power required to move the air 14 through the dehumidification unit 10, the compressive power of the vacuum pump 52 to compress the water vapor 26 to approximately the saturation pressure (for example, to approximately 1.0 psia, or to a saturation pressure that corresponds to a given condensation temperature, for example, approximately 100° F.), the pumping and/or fan power of the condensation unit 54 (e.g., depending on whether cooling tower water or ambient air is used as the cooling medium), the pumping power of the liquid pump 60 to reject the liquid water from the condensation unit 54 at ambient conditions, and the power of the vacuum pump 62 to purge noncondensable components 30 that leak into the water vapor vacuum volume 28 of the dehumidification unit 10. As such, the only relatively major power component required to operate the dehumidification unit 10 is the compressive power of the vacuum pump 52 to compress the water vapor 26 to approximately the saturation pressure (for example, only to approximately 1.0 psia, or to a saturation pressure that corresponds to a given condensation temperature, for example, approximately 100° F.). As mentioned previously, this power is relatively low and, therefore, operating the dehumidification unit 10 is relatively inexpensive as opposed to conventional refrigeration compression dehumidification systems. Moreover, calculations for an embodiment indicate that the dehumidification unit 10 has a coefficient of performance (COP) at least twice as high (or even up to five times as high, depending on operating conditions) as these conventional dehumidification systems. In addition, the dehumidification unit 10 enables the dehumidification of air without reducing the temperature of the air below the temperature at which the air is needed, as is often done in conventional dehumidification systems.

Figure 8:
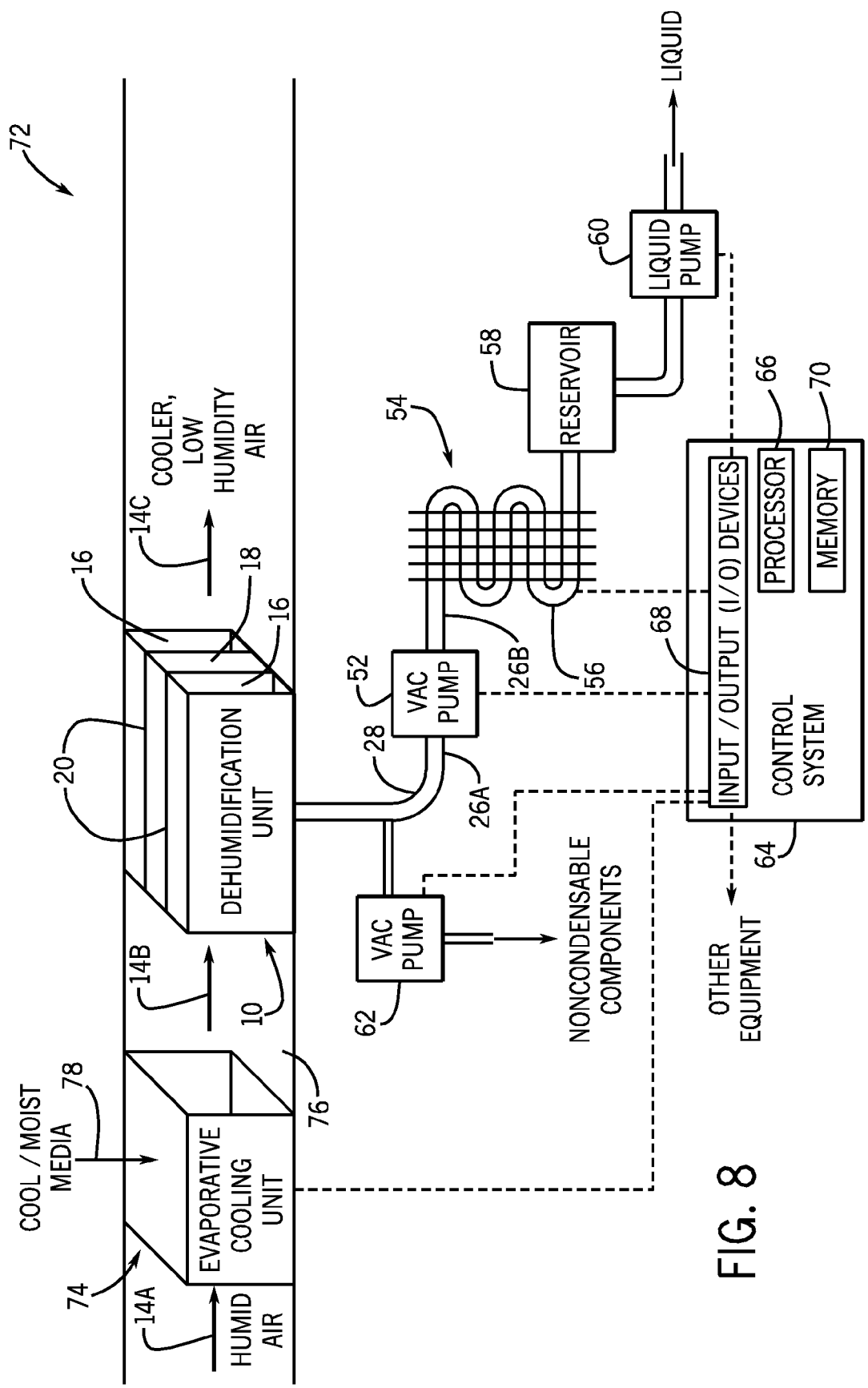
FIG. 8 is a schematic diagram of an HVAC system having an evaporative cooling unit disposed upstream of the dehumidification unit in accordance with an embodiment of the present disclosure.

In certain embodiments, as indicated previously, the dehumidification unit 10 described with respect to FIGS. 1 through 7 may be used in conjunction with one or more evaporative cooling units 12. For example, FIG. 8 is a schematic diagram of an HVAC system 72 having an evaporative cooling unit 74 disposed upstream of the dehumidification unit 10 in accordance with an embodiment of the present disclosure. The HVAC system 72 of FIG. 8 generally functions the same as the HVAC system 8 of FIGS. 1, 6, and 7. However, as illustrated in FIG. 8, the HVAC system 72 specifically includes the evaporative cooling unit 74 disposed upstream of the dehumidification unit 10. Thus, the HVAC system 72 first receives the relatively humid inlet air 14A into the evaporative cooling unit 74, instead of the dehumidification unit 10. The evaporative cooling unit 74 reduces the temperature of the relatively humid inlet air 14A and expels cooler (but still relatively humid) air 14B, which is directed into the dehumidification unit 10 via a duct 76. As described previously, the cooler (but still relatively humid) air 14B is then dehumidified in the dehumidification unit 10 and expelled as relatively dry air 14C into the conditioned space.

The evaporative cooling unit 74 of FIG. 8 may either be a direct evaporative cooling unit or an indirect evaporative cooling unit. In other words, when the evaporative cooling unit 74 uses direct evaporative cooling techniques, a relatively cool and moist media 78 (e.g., relatively cool water) is directly added to the relatively humid inlet air 14A. However, when the evaporative cooling unit 74 uses indirect evaporative cooling techniques, the relatively humid air 14A may, for example, flow across one side of a plate of a heat exchanger while the relatively cool and moist media 78 flows across another side of the plate of the heat exchanger. In other words, generally speaking, some of the relatively cool moisture from the relatively cool and moist media 78 is indirectly added to the relatively humid air 14A. Whether direct or indirect evaporative cooling techniques are used in the evaporative cooling unit 74 affects the rate of humidity removal and temperature reduction of the air 14 that flows through the HVAC system 72 of FIG. 8. In general, however, the evaporative cooling unit 74 of FIG. 8 initially cools the air 14 to a temperature as low as possible for the particular application, and the dehumidification unit 10 lowers the humidity ratio at approximately constant temperature.

As illustrated, many of the components of the HVAC system 72 of FIG. 8 may be considered identical to the components of the HVAC system 8 of FIGS. 1, 6, and 7. For example, as described previously, HVAC system 72 of FIG. 8 includes the condensation unit 54 that receives water vapor 26B having a partial pressure just high enough to facilitate condensation, as described previously. In certain embodiments, the HVAC system 72 of FIG. 8 may also include the reservoir 58 for temporary storage of saturated vapor and liquid water. However, as described previously, in other embodiments, no reservoir may be used. In either case, the liquid water from the condensation unit 54 may be directed into the liquid pump 60, within which the pressure of the liquid water from the condensation unit 54 is increased to approximately atmospheric pressure (i.e., approximately 14.7 psia) so that the liquid water may be rejected at ambient conditions.

In addition, the control system 64 of FIG. 7 may also be used in the HVAC system 72 of FIG. 8 to control the operation of the HVAC system 72 in a similar manner as described previously with respect to FIG. 7. For example, as described previously, the control system 64 may be configured to control the rate of removal of the noncondensable components 30 of the water vapor 26A in the water vapor vacuum volume 28 by turning the vacuum pump 52 (or separate vacuum pump 62) on or off, or by modulating the rate at which the vacuum pump 52 (or separate vacuum pump 62) removes the noncondensable components 30. More specifically, in certain embodiments, the control system 64 may receive signals from sensors in the water vapor vacuum volume 28 that detect when too many noncondensable components 30 are present in the water vapor 26A contained in the water vapor vacuum volume 28.

In addition, the control system 64 may modulate the lower partial pressure of the water vapor 26A in the water vapor vacuum volume 28 to modify the water vapor removal capacity and efficiency ratio of the dehumidification unit 10. For example, the control system 64 may receive signals from pressure sensors in the water vapor vacuum volume 28, the water vapor channels 18, as well as signals generated by sensors relating to characteristics (e.g., temperature, pressure, flow rate, relative humidity, and so forth) of the air 14 in the evaporative cooling unit 74, the dehumidification unit 10, or both, among other things.

The control system 64 may use this information to determine how to modulate the lower partial pressure of the water vapor 26A in the water vapor vacuum volume 28 to increase or decrease the rate of removal of water vapor 26 from the air channels 16 to the water vapor channels 18 through the interfaces 20 of the dehumidification unit 10 as $H_2O$ (i.e., as water molecules, gaseous water vapor, liquid water, adsorbed/desorbed water molecules, absorbed/desorbed water molecules, and so forth, through the interfaces 20). For example, if more water vapor removal is desired, the lower partial pressure of the water vapor 26A in the water vapor vacuum volume 28 may be reduced and, conversely, if less water vapor removal is desired, the lower partial pressure of the water vapor 26A in the water vapor vacuum volume 28 may be increased. Furthermore, as described above, the amount of dehumidification (i.e., water vapor removal) may be cycled to improve the efficiency of the dehumidification unit 10. More specifically, under certain operating conditions, the dehumidification unit 10 may function more efficiently at higher rates of water vapor removal. As such, in certain embodiments, the dehumidification unit 10 may be cycled to remove a maximum amount of water vapor from the air 14 for a while, then to remove relatively no water vapor from the air 14 for a while, then to remove a maximum amount of water vapor from the air 14 for a while, and so forth. In other words, the dehumidification unit 10 may be operated at full water vapor removal capacity for periods of time alternating with other periods of time where no water vapor is removed.

Furthermore, the control system 64 may also be configured to control operation of the evaporative cooling unit 74. For example, the control system 64 may selectively modulate how much (direct or indirect) evaporative cooling occurs in the evaporating cooling unit 74. As an example, valves may be actuated to control the flow rate of the relatively cool and moist media 78 through the evaporative cooling unit 74, thereby directly affecting the amount of (direct or indirect) evaporative cooling in the evaporative cooling unit 74. In addition, operation of the evaporative cooling unit 74 and the dehumidification unit 10 may be controlled simultaneously. Furthermore, the control system 64 may be configured to control start-up and shutdown sequencing of the evaporative cooling unit 74 and the dehumidification unit 10.

Figure 9A:
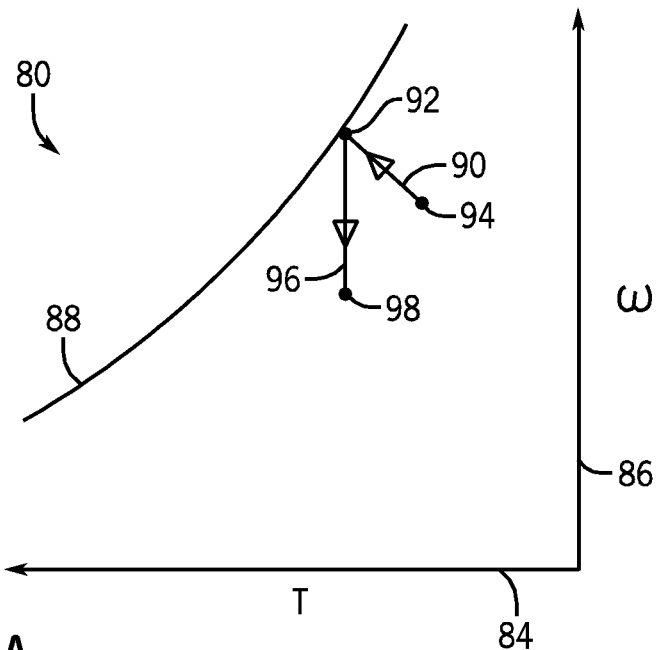
FIG. 9A is a psychrometric chart of the temperature and the humidity ratio of the air flowing through a direct evaporative cooling unit and the dehumidification unit of FIG. 8 in accordance with an embodiment of the present disclosure.
Figure 9B:
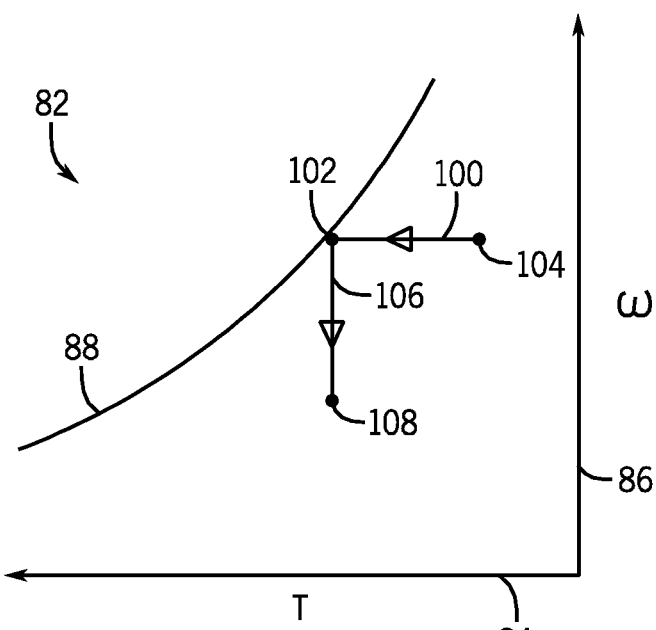
FIG. 9B is a psychrometric chart of the temperature and the humidity ratio of the air flowing through an indirect evaporative cooling unit and the dehumidification unit of FIG. 8 in accordance with an embodiment of the present disclosure.

FIGS. 9A and 9B are psychrometric charts 80, 82 of the temperature and the humidity ratio of the air 14 flowing through the evaporative cooling unit 74 and the dehumidification unit 10 of FIG. 8 in accordance with an embodiment of the present disclosure. More specifically, FIG. 9A is the psychrometric chart 80 of the temperature and the humidity ratio of the air 14 flowing through a direct evaporative cooling unit 74 and the dehumidification unit 10 of FIG. 8 in accordance with an embodiment of the present disclosure, and FIG. 9B is the psychrometric chart 82 of the temperature and the humidity ratio of the air 14 flowing through an indirect evaporative cooling unit 74 and the dehumidification unit 10 of FIG. 8 in accordance with an embodiment of the present disclosure. In particular, in each chart 80, 82, the x-axis 84 corresponds to the temperature of the air 14 flowing through the evaporative cooling unit 74 and the dehumidification unit 10 of FIG. 8, the y-axis 86 corresponds to the humidity ratio of the air 14 flowing through the evaporative cooling unit 74 and the dehumidification unit 10 of FIG. 8, and the curve 88 represents the water vapor saturation curve for a given relative humidity of the air 14 flowing through the evaporative cooling unit 74 and the dehumidification unit 10 of FIG. 8.

As illustrated by line 90 in FIG. 9A, because the relatively cool and moist media 78 is directly introduced into the air 14 flowing though the direct evaporative cooling unit 74, the humidity ratio of the air 14B (i.e., point 92) out of the direct evaporative cooling unit 74 is substantially higher than the humidity ratio of the inlet air 14A (i.e., point 94) into the direct evaporative cooling unit 74. However, the temperature of the air 14B (i.e., point 92) out of the direct evaporative cooling unit 74 is substantially lower than the temperature of the inlet air 14A (i.e., point 94) into the evaporative cooling unit 74. As illustrated by line 96 of FIG. 9A, because water vapor 26 is removed from the air 14B flowing through the dehumidification unit 10, the humidity ratio of the outlet air 14C (i.e., point 98) from the dehumidification unit 10 is lower than the humidity ratio of the air 14B (i.e., point 92) into the dehumidification unit 10, while the temperature of the outlet air 14C and the air 14B are substantially the same. Indeed, the direct evaporative cooling unit 74 humidifies and cools the air 14, while the dehumidification unit 10 subsequently dehumidifies the air 14 at substantially constant temperature.

As illustrated by line 100 in FIG. 9B, because the relatively cool and moist media 78 indirectly cools the air 14 flowing through the indirect evaporative cooling unit 74, the humidity ratio of the air 14B (i.e., point 102) out of the indirect evaporative cooling unit 74 is substantially the same as the humidity ratio of the inlet air 14A (i.e., point 104) into the indirect evaporative cooling unit 74. However, the temperature of the air 14B (i.e., point 102) out of the indirect evaporative cooling unit 74 is substantially lower than the temperature of the inlet air 14A (i.e., point 104) into the indirect evaporative cooling unit 74. As illustrated by line 106 of FIG. 9B, because water vapor 26 is removed from the air 14B flowing through the dehumidification unit 10, the humidity ratio of the outlet air 14C (i.e., point 108) from the dehumidification unit 10 is lower than the humidity ratio of the air 14B (i.e., point 102) into the dehumidification unit 10, while the temperature of the outlet air 14C and the air 14B are substantially the same. Indeed, the indirect evaporative cooling unit 74 cools (without substantially humidifying) the air 14, while the dehumidification unit 10 subsequently dehumidifies the air 14 at substantially constant temperature.

As described previously, the control system 64 of FIG. 8 may be configured to control the operation of the evaporative cooling unit 74 and the dehumidification unit 10. For example, the control system 64 may be configured to adjust where points 92, 94, 98 and points 102, 104, 108 of the air 14 fall in the psychrometric charts 80, 82 of FIGS. 9A and 9B when direct and indirect evaporative cooling techniques, respectively, are used in the evaporative cooling unit 74 of FIG. 8.

Figure 10:
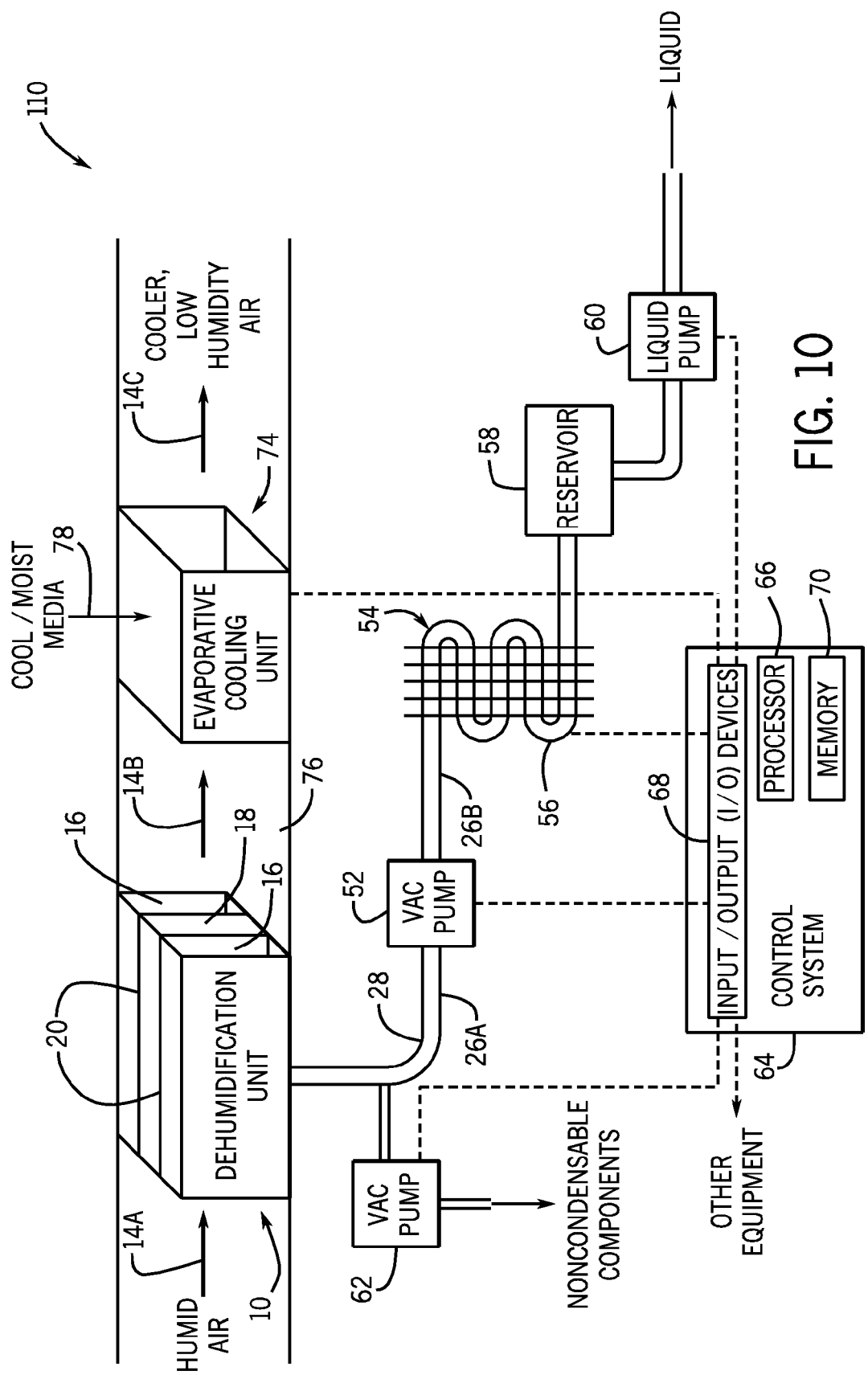
FIG. 10 is a schematic diagram of an HVAC system having the evaporative cooling unit disposed downstream of the dehumidification unit in accordance with an embodiment of the present disclosure.

FIG. 10 is a schematic diagram of an HVAC system 110 having the evaporative cooling unit 74 disposed downstream of the dehumidification unit 10 in accordance with an embodiment of the present disclosure. The HVAC system 110 of FIG. 10 generally functions the same as the HVAC system 8 of FIGS. 1, 6, and 7 and the HVAC system 72 of FIG. 8.

However, as illustrated in FIG. 10, the HVAC system 110 first receives the relatively humid inlet air 14A into the dehumidification unit 10. As described previously, the relatively humid inlet air 14A is first dehumidified in the dehumidification unit 10 and expelled as relatively dry air 14B into the duct 76. The evaporative cooling unit 74 then reduces the temperature of the dry air 14B and expels cooler dry air 14C into the conditioned space.

As described previously with respect to FIG. 8, the evaporative cooling unit 74 of FIG. 10 may either be a direct evaporative cooling unit or an indirect evaporative cooling unit. In other words, when the evaporative cooling unit 74 uses direct evaporative cooling techniques, the relatively cool and moist media 78 (e.g., relatively cool water) is directly added to the relatively dry air 14B in the duct 76. However, when the evaporative cooling unit 74 uses indirect evaporative cooling techniques, the relatively dry air 14B may, for example, flow across one side of a plate of a heat exchanger while the relatively cool and moist media 78 flows across another side of the plate of the heat exchanger. In other words, generally speaking, some of the relatively cool moisture from the relatively cool and moist media 78 is indirectly added to the relatively dry air 14B in the duct 76. Whether direct or indirect evaporative cooling techniques are used in the evaporative cooling unit 74 affects the rate of humidity removal and temperature reduction of the air 14 that flows through the HVAC system 110 of FIG. 10. In general, however, the dehumidification unit 10 initially lowers the humidity ratio at approximately constant temperature, and the evaporative cooling unit 74 cools the air 14 to a temperature as low as possible for the particular application.

As illustrated, many of the components of the HVAC system 110 of FIG. 10 may be considered identical to the components of the HVAC system 8 of FIGS. 1, 6, and 7 and the HVAC system 72 of FIG. 8. For example, as described previously, HVAC system 110 of FIG. 10 includes the condensation unit 54 that receives water vapor 26B having a partial pressure just high enough to facilitate condensation, as described previously. In certain embodiments, the HVAC system 110 of FIG. 10 may also include the reservoir 58 for temporary storage of saturated vapor and liquid water. However, as described previously, in other embodiments, no reservoir may be used. In either case, the liquid water from the condensation unit 54 may be directed into the liquid pump 60, within which the pressure of the liquid water from the condensation unit 54 is increased to approximately atmospheric pressure (i.e., approximately 14.7 psia) so that the liquid water may be rejected at ambient conditions.

In addition, the control system 64 of FIGS. 7 and 8 may also be used in the HVAC system 110 of FIG. 10 to control the operation of the HVAC system 110 in a similar manner as described previously with respect to FIGS. 7 and 8. For example, as described previously, the control system 64 may be configured to control the rate of removal of the noncondensable components 30 of the water vapor 26A in the water vapor vacuum volume 28 by turning the vacuum pump 52 (or separate vacuum pump 62) on or off, or by modulating the rate at which the vacuum pump 52 (or separate vacuum pump 62) removes the noncondensable components 30. More specifically, in certain embodiments, the control system 64 may receive signals from sensors in the water vapor vacuum volume 28 that detect when too many noncondensable components 30 are present in the water vapor 26A contained in the water vapor vacuum volume 28.

In addition, the control system 64 may modulate the lower partial pressure of the water vapor 26A in the water vapor vacuum volume 28 to modify the water vapor removal capacity and efficiency ratio of the dehumidification unit 10. For example, the control system 64 may receive signals from pressure sensors in the water vapor vacuum volume 28, the water vapor channels 18, as well as signals generated by sensors relating to characteristics (e.g., temperature, pressure, flow rate, relative humidity, and so forth) of the air 14 in the dehumidification unit 10, the evaporative cooling unit 74, or both, among other things.

The control system 64 may use this information to determine how to modulate the lower partial pressure of the water vapor 26A in the water vapor vacuum volume 28 to increase or decrease the rate of removal of water vapor 26 from the air channels 16 to the water vapor channels 18 through the interfaces 20 of the dehumidification unit 10 as $H_2O$ (i.e., as atomic water, gaseous water vapor, liquid water, and so forth, adsorbed or absorbed through the interfaces 20). For example, if more water vapor removal is desired, the lower partial pressure of the water vapor 26A in the water vapor vacuum volume 28 may be reduced and, conversely, if less water vapor removal is desired, the lower partial pressure of the water vapor 26A in the water vapor vacuum volume 28 may be increased. Furthermore, as described above, the amount of dehumidification (i.e., water vapor removal) may be cycled to improve the efficiency of the dehumidification unit 10. More specifically, under certain operating conditions, the dehumidification unit 10 may function more efficiently at higher rates of water vapor removal. As such, in certain embodiments, the dehumidification unit 10 may be cycled to remove a maximum amount of water vapor from the air 14 for a while, then to remove relatively no water vapor from the air 14 for a while, then to remove a maximum amount of water vapor from the air 14 for a while, and so forth. In other words, the dehumidification unit 10 may be operated at full water vapor removal capacity for periods of time alternating with other periods of time where no water vapor is removed.

Furthermore, the control system 64 may also be configured to control operation of the evaporative cooling unit 74. For example, the control system 64 may selectively modulate how much (direct or indirect) evaporative cooling occurs in the evaporating cooling unit 74. As an example, valves may be actuated to control the flow rate of the relatively cool and moist media 78 through the evaporative cooling unit 74, thereby directly affecting the amount of (direct or indirect) evaporative cooling in the evaporative cooling unit 74. In addition, operation of the dehumidification unit 10 and the evaporative cooling unit 74 may be controlled simultaneously. Furthermore, the control system 64 may be configured to control start-up and shutdown sequencing of the dehumidification unit 10 and the evaporative cooling unit 74.

Figure 11A:
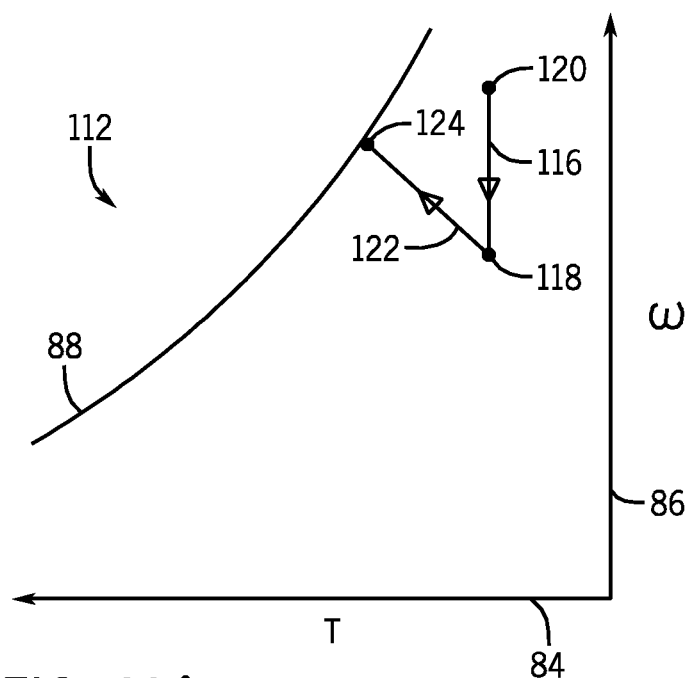
FIG. 11A is a psychrometric chart of the temperature and the humidity ratio of the air flowing through the dehumidification unit and a direct evaporative cooling unit of FIG. 10 in accordance with an embodiment of the present disclosure.
Figure 11B:
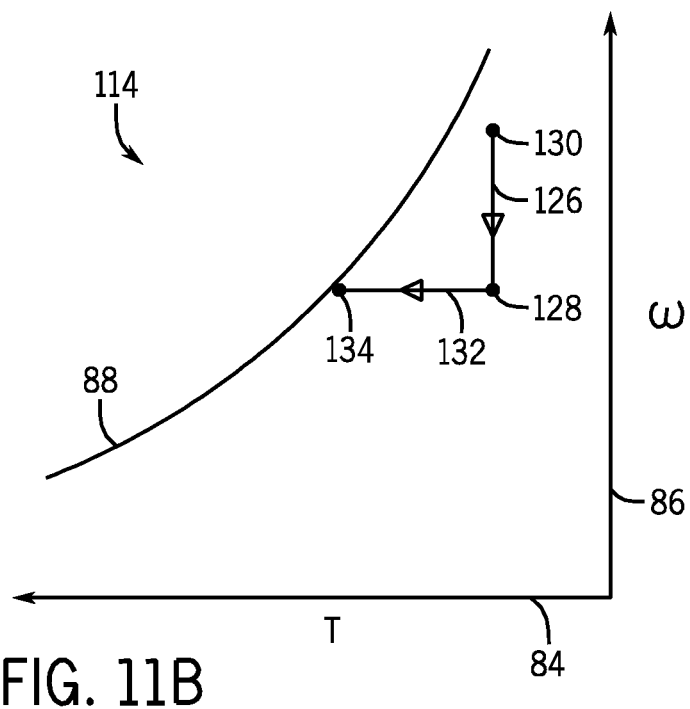
FIG. 11B is a psychrometric chart of the temperature and the humidity ratio of the air flowing through the dehumidification unit and an indirect evaporative cooling unit of FIG. 10 in accordance with an embodiment of the present disclosure.

FIGS. 11A and 11B are psychrometric charts 112, 114 of the temperature and the humidity ratio of the air 14 flowing through the dehumidification unit 10 and the evaporative cooling unit 74 of FIG. 10 in accordance with an embodiment of the present disclosure. More specifically, FIG. 11A is the psychrometric chart 112 of the temperature and the humidity ratio of the air 14 flowing through the dehumidification unit 10 and a direct evaporative cooling unit 74 of FIG. 10 in accordance with an embodiment of the present disclosure, and FIG. 11B is the psychrometric chart 114 of the temperature and the humidity ratio of the air 14 flowing through the dehumidification unit 10 and an indirect evaporative cooling unit 74 of FIG. 10 in accordance with an embodiment of the present disclosure. In particular, as described previously with respect to FIGS. 9A and 9B, the x-axis 84 corresponds to the temperature of the air 14 flowing through the dehumidification unit 10 and the evaporative cooling unit 74 of FIG. 10, the y-axis 86 corresponds to the humidity ratio of the air 14 flowing through the dehumidification unit 10 and the evaporative cooling unit 74 of FIG. 10, and the curve 88 represents the water vapor saturation curve for a given relative humidity of the air 14 flowing through the dehumidification unit 10 and the evaporative cooling unit 74 of FIG. 10.

As illustrated by line 116 in FIG. 11A, because water vapor 26 is removed from the relatively humid inlet air 14A flowing through the dehumidification unit 10, the humidity ratio of the relatively dry air 14B (i.e., point 118) from the dehumidification unit 10 is lower than the humidity ratio of the relatively humid inlet air 14A (i.e., point 120) into the dehumidification unit 10, while the temperature of the relatively dry air 14B and the relatively humid inlet air 14A are substantially the same. As illustrated by line 122 of FIG. 11A, because the relatively cool and moist media 78 is directly introduced into the relatively dry air 14B flowing through the direct evaporative cooling unit 74, the humidity ratio of the outlet air 14C (i.e., point 124) from the direct evaporative cooling unit 74 is substantially higher than the humidity ratio of the relatively dry air 14B (i.e., point 118) into the direct evaporative cooling unit 74. However, the temperature of the outlet air 14C (i.e., point 124) from the direct evaporative cooling unit 74 is substantially lower than the temperature of the relatively dry air 14B (i.e., point 118) into the direct evaporative cooling unit 74. Indeed, the dehumidification unit 10 dehumidifies the air 14 at substantially constant temperature, while the direct evaporative cooling unit 74 subsequently humidifies and cools the air 14.

As illustrated by line 126 in FIG. 11B, because water vapor 26 is removed from the relatively humid inlet air 14A flowing through the dehumidification unit 10, the humidity ratio of the relatively dry air 14B (i.e., point 128) from the dehumidification unit 10 is lower than the humidity ratio of the relatively humid inlet air 14A (i.e., point 130) into the dehumidification unit 10, while the temperature of the relatively dry air 14B and the relatively humid inlet air 14A are substantially the same. As illustrated by line 132 of FIG. 11B, because the relatively cool and moist media 78 indirectly cools the relatively dry air 14B flowing though the indirect evaporative cooling unit 74, the humidity ratio of the outlet air 14C (i.e., point 134) from the indirect evaporative cooling unit 74 is substantially the same as the humidity ratio of the relatively dry air 14B (i.e., point 128) into the indirect evaporative cooling unit 74. However, the temperature of the outlet air 14C (i.e., point 134) from the indirect evaporative cooling unit 74 is substantially lower than the temperature of the relatively dry air 14B (i.e., point 128) into the indirect evaporative cooling unit 74. Indeed, the dehumidification unit 10 dehumidifies the air 14 at substantially constant temperature, while the indirect evaporative cooling unit 74 cools (without substantially humidifying) the air 14.

As described previously, the control system 64 of FIG. 10 may be configured to control the operation of the dehumidification unit 10 and the evaporative cooling unit 74. For example, the control system 64 may be configured to adjust where points 118, 120, 124 and points 128, 130, 134 of the air 14 fall in the psychrometric charts 112, 114 of FIGS. 11A and 11B when direct and indirect evaporative cooling techniques, respectively, are used in the evaporative cooling unit 74 of FIG. 10.

The embodiments of the HVAC systems 72, 110 of FIGS. 8 and 10 are not the only ways in which dehumidification units 10 may be combined with evaporative cooling units 74. More specifically, whereas FIGS. 8 and 10 illustrate the use of a single dehumidification unit 10 and a single evaporative cooling unit 74 in series with each other, in other embodiments, any number of dehumidification units 10 and evaporative cooling units 74 may be used in series with each other. For example, FIG. 1 illustrates the dehumidification unit 10 having evaporative cooling units disposed on both sides (i.e., both upstream and downstream) of the dehumidification unit 10. As another example, in one embodiment, a first dehumidification unit 10 may be followed by a first evaporative cooling unit 74, which is in turn followed by a second dehumidification unit 10, which is in turn followed by a second evaporative cooling unit 74, and so forth. However, any number of dehumidification units 10 and evaporative cooling units 74 may indeed be used in series with each other, wherein the air 14 exiting each unit 10, 74 is directed into the next downstream unit 10, 74 in the series (except from the last unit 10, 74 in the series, from which the air 14 is expelled into the conditioned space). In other words, the air 14 exiting each dehumidification unit 10 in the series is directed into a downstream evaporative cooling unit 74 (or to the conditioned space, if it is the last unit in the series), and the air 14 exiting each evaporative cooling unit 74 in the series is directed into a downstream dehumidification unit 10 (or to the conditioned space, if it is the last unit in the series). As such, the temperature of the air 14 may be successively lowered in each evaporative cooling unit 74 between dehumidification units 10 in the series, and the humidity ratio of the air 14 may be successively lowered in each dehumidification unit 10 between evaporative cooling units 74 in the series. This process may be continued within any number of dehumidification units 10 and evaporative cooling units 74 until the desired final temperature and humidity ratio conditions of the air 14 are achieved.

Figure 12A:
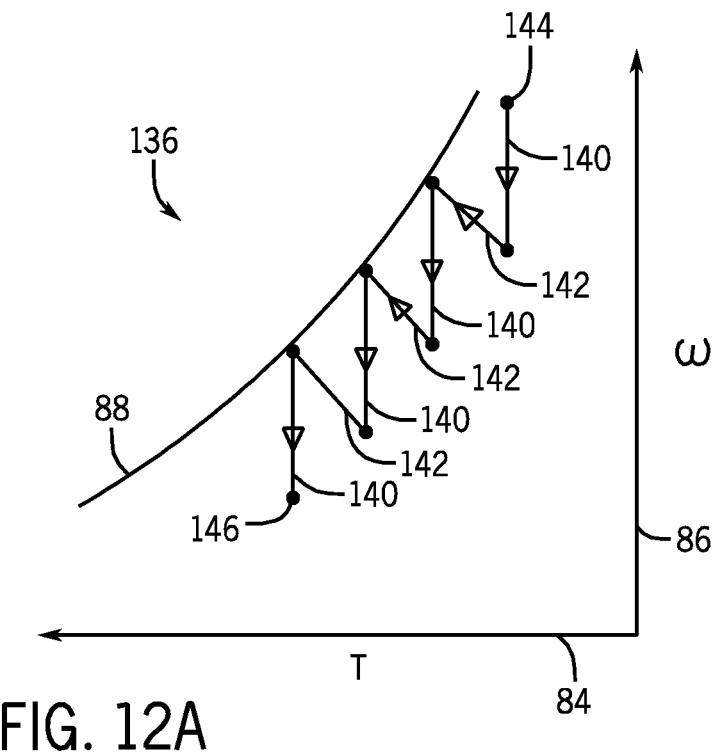
FIG. 12A is a psychrometric chart of the temperature and the humidity ratio of the air flowing through a plurality of dehumidification units and a plurality of direct evaporative cooling units in accordance with an embodiment of the present disclosure.
Figure 12B:
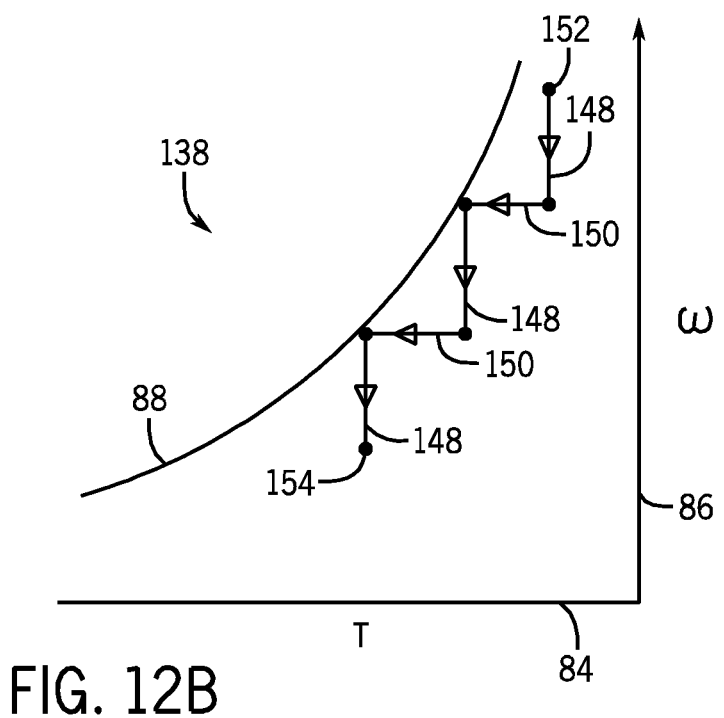
FIG. 12B is a psychrometric chart of the temperature and the humidity ratio of the air flowing through a plurality of dehumidification units and a plurality of indirect evaporative cooling units in accordance with an embodiment of the present disclosure.

FIGS. 12A and 12B are psychrometric charts 136, 138 of the temperature and the humidity ratio of the air 14 flowing through a plurality of dehumidification units 10 and a plurality of evaporative cooling units 74 in accordance with an embodiment of the present disclosure. More specifically, FIG. 12A is a psychrometric chart 136 of the temperature and the humidity ratio of the air 14 flowing through a plurality of dehumidification units 10 and a plurality of direct evaporative cooling units 74 in accordance with an embodiment of the present disclosure, and FIG. 12B is a psychrometric chart 138 of the temperature and the humidity ratio of the air 14 flowing through a plurality of dehumidification units 10 and a plurality of indirect evaporative cooling units 74 in accordance with an embodiment of the present disclosure. In particular, in each chart 136, 138, the x-axis 84 corresponds to the temperature of the air 14 flowing through the plurality of dehumidification units 10 and the plurality of evaporative cooling units 74, the y-axis 86 corresponds to the humidity ratio of the air 14 flowing through the plurality of dehumidification units 10 and the plurality of evaporative cooling units 74, and the curve 88 represents the water vapor saturation curve for a given relative humidity of the air 14 flowing through the plurality of dehumidification units 10 and the plurality of evaporative cooling units 74.

As illustrated by lines 140 in FIG. 12A, because water vapor 26 is removed from relatively humid air 14 flowing through each of the plurality of dehumidification units 10, the humidity ratio of the air 14 substantially decreases while the temperature of the air 14 remains substantially the same in each of the plurality of dehumidification units 10. As illustrated by lines 142 in FIG. 12A, because the relatively cool and moist media 78 is directly introduced into the relatively dry air 14 flowing though each of the direct evaporative cooling units 74, the humidity ratio of the air 14 increases while the temperature of the air 14 substantially decreases in each of the plurality of direct evaporative cooling units 74. In other words, each of the plurality of dehumidification units 10 successively dehumidifies the air 14 at substantially constant temperature, while each of the plurality of direct evaporative cooling units 74 successively humidifies and cools the air 14 until the desired final conditions of temperature and humidity ratio are achieved. More specifically, as illustrated in FIG. 12A, the lines 140, 142 generally form a "step function" progression from the initial conditions of temperature and humidity ratio of the inlet air 14 (i.e., point 144) to the final conditions of temperature and humidity ratio of the outlet air 14 (i.e., point 146).

As illustrated by lines 148 in FIG. 12B, because water vapor 26 is removed from relatively humid air 14 flowing through each of the plurality of dehumidification units 10, the humidity ratio of the air 14 substantially decreases while the temperature of the air 14 remains substantially the same in each of the plurality of dehumidification units 10. As illustrated by lines 150 in FIG. 12B, because the relatively cool and moist media 78 indirectly interacts with the relatively dry air 14 flowing though each of the indirect evaporative cooling units 74, the humidity ratio of the air 14 remains substantially the same while the temperature of the air 14 substantially decreases in each of the plurality of indirect evaporative cooling units 74. In other words, each of the plurality of dehumidification units 10 successively dehumidifies the air 14 at substantially constant temperature, while each of the plurality of indirect evaporative cooling units 74 successively cools the air 14 at substantially constant humidity ratio until the desired final conditions of temperature and humidity ratio are achieved. More specifically, as illustrated in FIG. 12B, the lines 148, 150 generally form a "sawtooth" progression from the initial conditions of temperature and humidity ratio of the inlet air 14 (i.e., point 152) to the final conditions of temperature and humidity ratio of the outlet air 14 (i.e., point 154).

Because evaporative cooling units 74 are used between dehumidification units 10, each dehumidification unit 10 will receive air 14 that is cooler and at a lower partial pressure of water vapor than the upstream dehumidification units 10. As such, each of the dehumidification units 10 will operate at substantially different operating conditions. Accordingly, the control system 64 may be used to modulate the operating parameters (e.g., the partial pressures of water vapor in the water vapor vacuum volumes 28, among other things) of the dehumidification units 10 to take into account the variations between dehumidification units 10. Similarly, because dehumidification units 10 are used between evaporative cooling units 74, each evaporative cooling unit 74 will also receive air 14 that is cooler and at a lower partial pressure of water vapor than the upstream evaporative cooling units 74. As such, each of the evaporative cooling units 74 will also operate at substantially different operating conditions. Accordingly, the control system 64 may also be used to modulate the operating parameters (e.g., the flow rates of the relatively cool and moist media 78, among other things) of the evaporative cooling units 74 to take into account the variations between evaporative cooling units 74. In addition, the control system 64 may also simultaneously coordinate operation of the plurality of dehumidification units 10 and the plurality of evaporative cooling units 74 to take the variations into account.

The evaporative cooling units 74 of FIGS. 8 and 10 not only serve to lower the temperature of the air 14, but also serve to clean the air 14 by, for example, passing the air 14 through a moist, fibrous mat. In addition, the dehumidification units 10 and the evaporative cooling units 14 may be operated at variable speeds or fixed speeds for optimal operation between different initial temperature and humidity conditions (i.e., operating points 144 and 152 in FIGS. 12A and 12B, respectively) and the final temperature and humidity conditions (i.e., operating points 146 and 154 in FIGS. 12A and 12B, respectively). Furthermore, the evaporative cooling units 74 are relatively low-energy units, thereby minimizing overall operating costs.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

The invention claimed is:

1. A dehumidification system for removing water vapor from an airstream, comprising:
    a first and second channel separated by a membrane, wherein the membrane is configured to facilitate removal of water vapor from an airstream flowing through the first channel by facilitating passage of $H_2O$ from the water vapor to the second channel through permeable volumes of the membrane while substantially blocking all other components of the airstream from passing through the membrane;
    a first evaporative cooling unit configured to cool the airstream downstream of the membrane;
    a second evaporative cooling unit configured to cool the airstream upstream of the membrane;
    a pressure increasing device configured to create a lower partial pressure of water vapor within the second channel than in the first channel, such that the $H_2O$ moves through the membrane to the second channel, wherein the pressure increasing device is also configured to increase the pressure of water vapor at an outlet of the pressure increasing device to a partial pressure of water vapor in a range suitable for subsequent condensing into liquid water, and
    a controller comprising a microprocessor configured to control operations of the dehumidification system.

2. The system of claim 1, wherein the operations comprise a first evaporative cooling operation provided by the first evaporative cooler, a first dehumidification operation provided by the pressure increasing device, and a second evaporative cooling operation provided by the second evaporative cooler during the operations.

3. The system of claim 2, wherein the controller is configured to control the operations of the dehumidification system so as to result in psychrometric chart control of the dehumidification system.

4. The system of claim 1, comprising a condensation device configured to receive water vapor from the pressure increasing device and condense the water vapor into liquid water.

5. The system of claim 4, comprising a water transport device configured to transport the liquid water from the condensation device.

6. The system of claim 1, wherein the membrane comprises zeolite.

7. A system, comprising:
    a dehumidification unit for removing $H_2O$ vapor from an airstream, comprising:
        an air channel configured to receive an inlet airstream and discharge an outlet airstream; and
        an $H_2O$ permeable material adjacent to the air channel, wherein the $H_2O$ permeable material is configured to selectively enable $H_2O$ from $H_2O$ vapor in the inlet airstream to pass through the $H_2O$ permeable material to a suction side of the $H_2O$ permeable material and substantially block other components in the inlet airstream from passing through the $H_2O$ permeable material to the suction side of the $H_2O$ permeable material;
    an evaporative cooling unit configured to cool the airstream;
    a pressure increasing device configured to create a lower partial pressure of $H_2O$ vapor on the suction side of the $H_2O$ permeable material than the partial pressure of the $H_2O$ vapor in the inlet airstream to drive passage of the $H_2O$ from the $H_2O$ vapor in the inlet airstream through the $H_2O$ permeable material, and to increase the pressure at an outlet of the pressure increasing device to a partial pressure of $H_2O$ vapor suitable for condensing $H_2O$ vapor into liquid $H_2O$; and
    a controller comprising a microprocessor configured to control a first operation of the dehumidification unit.

8. The system of claim 7, comprising a second evaporative cooling unit disposed upstream of the dehumidification unit.

9. The system of claim 7, wherein the controller is configured to control a second operation of the evaporative cooling unit.

10. The system of claim 7, comprising a condensation device configured to receive $H_2O$ vapor from the outlet of the pressure increasing device, and to condense the $H_2O$ vapor into liquid $H_2O$.

11. The system of claim 10, comprising a liquid pump configured to transport the liquid $H_2O$ from the condensation device.

12. The system of claim 7, wherein the $H_2O$ permeable material comprises an $H_2O$ permeable membrane.

13. The system of claim 7, wherein the $H_2O$ permeable material comprises zeolite.

14. The system of claim 7, wherein the dehumidification unit is a variable speed dehumidification unit, and the evaporative cooling unit is a variable speed evaporative cooling unit.

15. A method, comprising:
    receiving an airstream including $H_2O$ vapor into an air channel of a dehumidification unit, wherein the airstream has a first partial pressure of $H_2O$ vapor;
    cooling the airstream via an evaporative cooling unit;
    suctioning $H_2O$ into an $H_2O$ vapor channel of the dehumidification unit through an $H_2O$ permeable material of the dehumidification unit using a pressure differential across the $H_2O$ permeable material, wherein the $H_2O$ permeable material comprises zeolite and the $H_2O$ vapor channel has a second partial pressure of $H_2O$ vapor lower than the first partial pressure of $H_2O$ vapor of the airstream; and
    receiving $H_2O$ vapor from the $H_2O$ vapor channel into a pressure increasing device and increasing the pressure of the $H_2O$ vapor from the pressure increasing device to a third partial pressure of $H_2O$ vapor that is higher than the second partial pressure of $H_2O$ vapor.

16. The method of claim 15, comprising cooling the airstream via the evaporative cooling unit before directing the airstream into the dehumidification unit.

17. The method of claim 15, comprising cooling the airstream via the evaporative cooling unit after receiving the airstream from the dehumidification unit.

18. The method of claim 15, comprising cooling the airstream via a first evaporative cooling unit before directing the airstream into the dehumidification unit, and cooling the airstream via a second evaporative cooling unit after receiving the airstream from the dehumidification unit.

19. The method of claim 15, comprising receiving $H_2O$ vapor from the pressure increasing device into a condensation device and condensing the $H_2O$ vapor into liquid $H_2O$.

20. The method of claim 19, wherein the airstream has a first partial pressure of $H_2O$ vapor in a range of approximately 0.2-1.0 psia, the second partial pressure of $H_2O$ vapor is in a range of approximately 0.1-1.0 psia, and the third partial pressure of $H_2O$ vapor is in a range of approximately 0.25-1.1 psia.

21. The system of claim 3, wherein the psychrometric chart control comprises adjusting at least one point on a psychrometric chart.

* * * * *